(12) United States Patent
Takahashi et al.

(10) Patent No.: US 12,169,656 B2
(45) Date of Patent: Dec. 17, 2024

(54) MECHANISMS FOR RESERVING A SHEET FEEDING UNIT AT AN IMAGE FORMING APPARATUS, AND CONTROL METHOD THEREOF

(71) Applicant: CANON KABUSHIKI KAISHA, Tokyo (JP)

(72) Inventors: Yasuhiro Takahashi, Chiba (JP); Satoshi Okuma, Ibaraki (JP); Noritsugu Okayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/475,098

(22) Filed: Sep. 26, 2023

(65) Prior Publication Data

US 2024/0103786 A1  Mar. 28, 2024

(30) Foreign Application Priority Data

Sep. 28, 2022  (JP) ................................ 2022-154907

(51) Int. Cl.
  *G06F 3/12*  (2006.01)
(52) U.S. Cl.
  CPC .......... *G06F 3/1241* (2013.01); *G06F 3/1207* (2013.01); *G06F 3/121* (2013.01); *G06F 3/1255* (2013.01); *G06F 3/1259* (2013.01); *G06F 3/1268* (2013.01)
(58) Field of Classification Search
  CPC ...... G06F 3/1241; G06F 3/1207; G06F 3/121; G06F 3/1255; G06F 3/1259; G06F 3/1268
  See application file for complete search history.

(56) References Cited

U.S. PATENT DOCUMENTS

| 2002/0051161 A1* | 5/2002 | Kanazawa | ......... H04N 1/00411 |
| | | | 358/1.12 |
| 2008/0170262 A1* | 7/2008 | Takahashi | .......... G06K 15/1809 |
| | | | 358/1.15 |
| 2019/0155556 A1* | 5/2019 | Tsujita | .................. G06F 3/1239 |

FOREIGN PATENT DOCUMENTS

JP          2005104614 A      4/2005

* cited by examiner

*Primary Examiner* — Iriana Cruz

(74) *Attorney, Agent, or Firm* — Canon U.S.A., Inc., IP Division

(57) ABSTRACT

An image forming apparatus includes a plurality of sheet feeding units, a job reception unit configured to receive a print job, an instruction reception unit configured to receive a reservation instruction for reserving at least one sheet feeding unit of the plurality of sheet feeding units, an identification unit configured to identify a sheet feeding unit from among the plurality of sheet feeding units based on a setting of the received print job, and a notification unit configured to notify, in response to an execution instruction of a print job in which a sheet feeding unit for which the instruction reception unit has received the reservation instruction is identified, and in which a specific setting is not made, a user of information indicating that the sheet feeding unit is reserved.

8 Claims, 28 Drawing Sheets

FIG.20

< SHEET TYPE >
SELECT SHEET TYPE

| THIN PAPER 2 (52 - 59 g/m²) | THIN PAPER 1 (60 - 63 g/m²) | PLAIN PAPER 1 (64 - 75 g/m²) | PLAIN PAPER 2 (76 - 90 g/m²) |
| PLAIN PAPER 3 (91~105 g/m²) | THICK PAPER 1 (106 - 128 g/m²) | THICK PAPER 2 (129 - 150 g/m²) | THICK PAPER 3 (151 - 163 g/m²) |
| THICK PAPER 4 (164 - 180 g/m²) | THICK PAPER 5 (181 - 200 g/m²) | THICK PAPER 6 (201 - 256 g/m²) | THICK PAPER 7 (257 - 300 g/m²) |
| RECYCLED PAPER 1 (64 - 75 g/m²) | RECYCLED PAPER 2 (76 - 90 g/m²) | PUNCHED PAPER | OHP FILM |
| LABEL PAPER | INDEX PAPER (91 - 105 g/m²) | COLORED PAPER (64 - 81 g/m²) | |

TO ADVANCED SETTING

OK

MECHANISMS FOR RESERVING A SHEET FEEDING UNIT AT AN IMAGE FORMING APPARATUS, AND CONTROL METHOD THEREOF

BACKGROUND

Field

The present disclosure relates to an image forming apparatus and a control method of the image forming apparatus.

Description of the Related Art

There is a conventional technique for feeding a sheet from a sheet feeding deck designated by a user, or a sheet feeding deck automatically designated based on sheet information, from among a plurality of sheet feeding decks included in an image forming apparatus, and printing an image on the fed sheet (refer to Japanese Patent Application Laid-Open No. 2005-104614).

For example, after a certain user sets special sheets such as expensive sheets on one of a plurality of sheet feeding decks of an image forming apparatus, another user different from the user who has intended to use the special sheets may perform printing using the sheet feeding deck for another purpose, and thereby wasting the special sheets.

SUMMARY

Various embodiments of the present disclosure are directed to preventing sheets set on a sheet feeding deck of an image forming apparatus, from being used in unintended printing.

According to one embodiment of the present disclosure, an image forming apparatus includes a plurality of sheet feeding units, a job reception unit configured to receive a print job, an instruction reception unit configured to receive a reservation instruction for reserving at least one sheet feeding unit of the plurality of sheet feeding units, an identification unit configured to identify a sheet feeding unit from among the plurality of sheet feeding units based on a setting of the received print job, and a notification unit configured to notify, in response to an execution instruction of a print job in which a sheet feeding unit for which the instruction reception unit has received the reservation instruction is identified, and in which a specific setting is not made, a user of information indicating that the sheet feeding unit is reserved.

According to another embodiment of the present disclosure, an image forming apparatus includes a plurality of sheet feeding units, a job reception unit configured to receive a print job, an execution unit configured to execute the received print job based on an execution instruction, an instruction reception unit configured to receive a reservation instruction for reserving at least one sheet feeding unit of the plurality of sheet feeding units, and an identification unit configured to identify a sheet feeding unit from among the plurality of sheet feeding units based on a setting of the received print job, wherein, regardless of an execution instruction of a print job in which a sheet feeding unit for which the instruction reception unit has received the reservation instruction is identified and in which a specific setting is not made, the execution unit does not execute the print job.

Further features of the present disclosure will become apparent from the following description of exemplary embodiments with reference to the attached drawings.

BRIEF DESCRIPTION OF THE DRAWINGS

FIG. 20 is a diagram illustrating an example of a sheet type designation screen of the image forming apparatus according to the fourth exemplary embodiment.

DESCRIPTION OF THE EMBODIMENTS

Hereinafter, exemplary embodiments of the present disclosure will be described in detail with reference to the accompanying drawings. The following exemplary embodiments are not intended to limit the present invention set forth in the appended claims. In addition, not all the combinations of features described in the present exemplary embodiments are essential to all embodiments of the present disclosure.

Hereinafter, an image forming apparatus according to a first exemplary embodiment will be described with reference to the drawings. Examples of the image forming apparatus includes a printer, a copier, a facsimile, and a multifunction peripheral having these functions, and has a function (print function) of forming an image on a sheet as a recording medium.

Figure 1A:
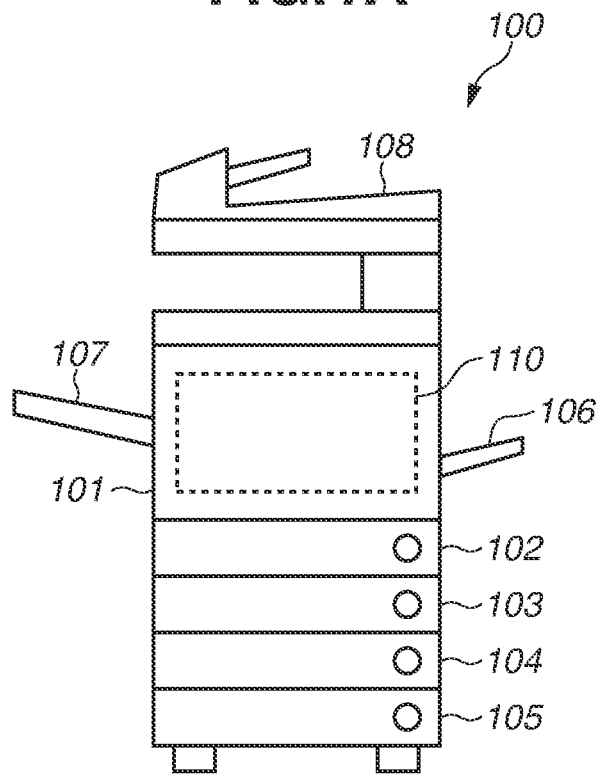
FIG. 1A is a diagram illustrating a front view of an image forming apparatus according to a first exemplary embodiment and FIG. 1B is a diagram illustrating a schematic diagram of a printer engine according to the first exemplary embodiment.

An image forming apparatus 100 illustrated in FIG. 1A is a multifunction peripheral that forms images on sheets. Examples of the sheets include paper such as sheets and envelopes, plastic films such as overhead projector (OHP) sheets, and cloth. In the drawings, the terms such as "sheet" and "sheet feeding" are used, and the term "sheet" is treated as a term meaning general sheets including sheets other than paper, unless otherwise stated.

The image forming apparatus 100 includes devices such as a printer unit 101, a scanner unit 108, a plurality of sheet feeding cassettes 102, 103, 104, and 105, a manual feeding tray 106, and a discharge tray 107. Hereinafter, the sheet feeding cassettes 102, 103, 104, and 105, and the manual feeding tray 106 will be referred to as sheet feeding decks unless discrimination is required.

The scanner unit 108 serving as an image reading device optically scans a document and converts the scanned document into electronic image information using a photoelectric conversion element such as a charge-coupled device (CCD) image sensor. Using a printer engine 110 serving as an example of an image forming unit, the printer unit 101 forms an image on a sheet based on image information input from the scanner unit 108 or an external host computer. The sheet feeding cassettes 102 to 105 store sheets, and the manual feeding tray 106 holds sheets placed on the tray. The sheets held in the sheet feeding cassettes 102 to 105 and the sheets held on the manual feeding tray 106 are fed to the printer engine 110 while being separated one by one by a sheet feeding unit 208 (described below). The sheet feeding cassettes 102 to 105 and the manual feeding tray 106 each serve as an example of a sheet feeding deck that holds sheets to be supplied to the image forming unit. Sheets on which images are formed by the printer engine 110 are discharged to the discharge tray 107 serving as a discharge unit.

Figure 1B:
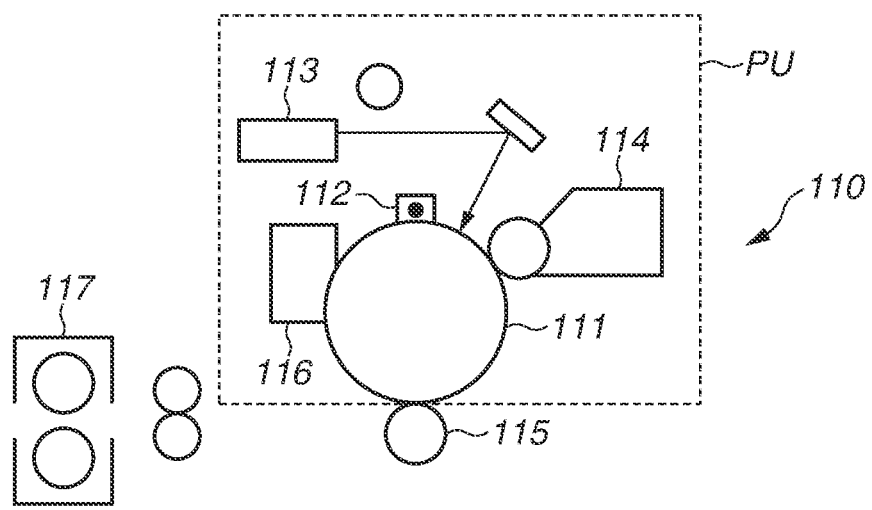

As illustrated in FIG. 1B, the printer engine 110 includes an electrophotographic image formation unit PU. The image formation unit PU includes a photosensitive drum 111 as a drum-shaped photosensitive member, a charging device 112, an exposure device 113, a development device 114, and a cleaning device 116. If a start request of an image formation operation is issued to the printer engine 110, the charging device 112 uniformly charges the surface of the photosensitive drum 111, and the exposure device 113 forms an electrostatic latent image on a drum surface by scanning the photosensitive drum 111 with laser beam. The development device 114 develops the electrostatic latent image into a toner image by supplying charged toner to the photosensitive drum 111. The toner image borne on the photosensitive drum 111 is transferred onto a sheet by a transfer device 115. The toner image transferred on the sheet is fixed onto the sheet by a fixing device 117 employing a heat fixing system, for example.

Figure 2:
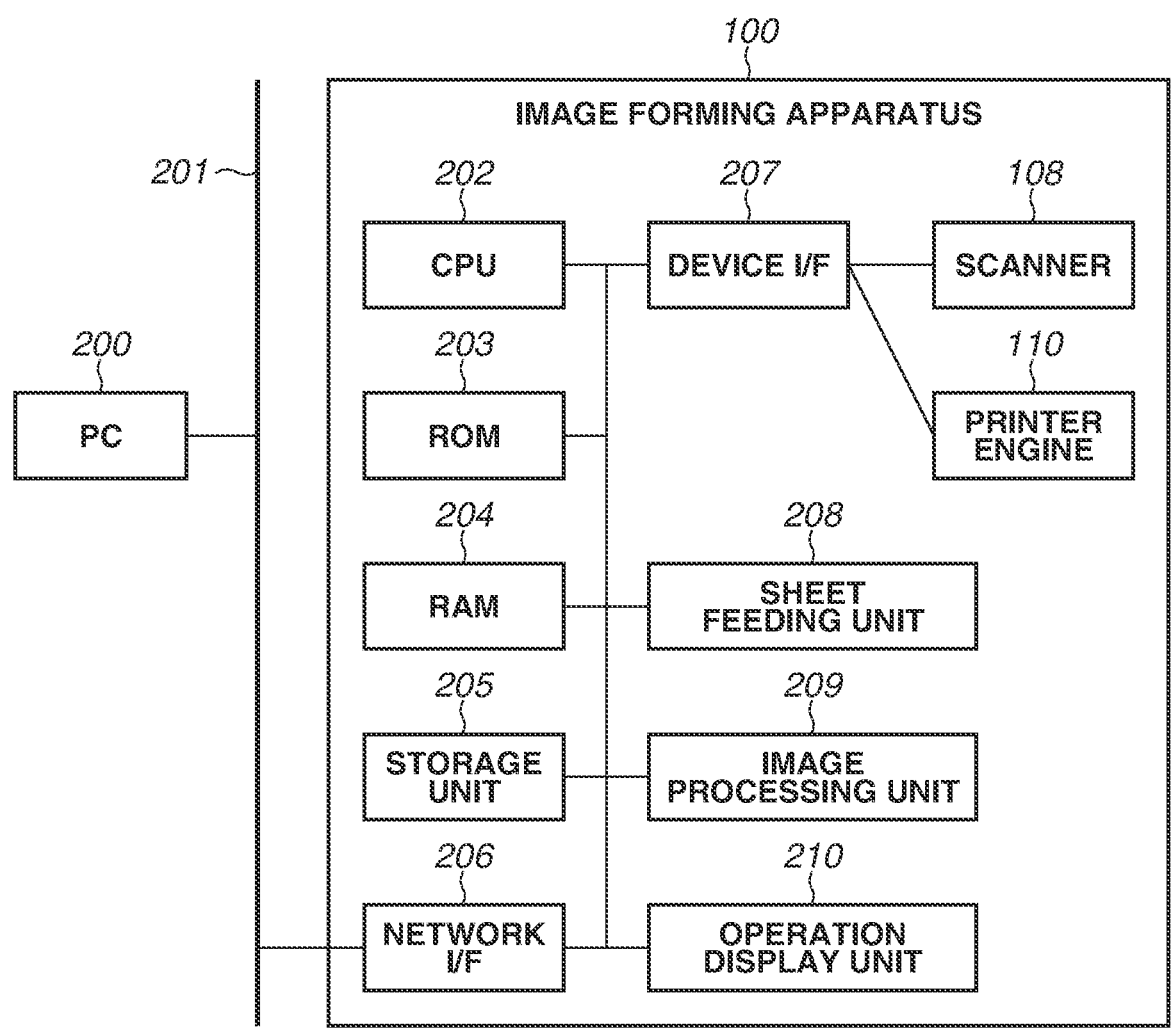
FIG. 2 is a diagram illustrating an overall view of a system including the image forming apparatus according to the first exemplary embodiment.

Next, an image forming system including the image forming apparatus 100 will be described with reference to FIG. 2.

The image forming apparatus 100 is connected to a wired or wireless network via a network interface (I/F) 206, and communicates with an information processing apparatus such as a personal computer (PC) 200.

As driver software that generates a job (hereinafter, print job) for instructing the image forming apparatus 100 to perform image formation, a printer driver is installed on the PC 200. Based on document data received from, for example, a document creation application of the PC 200, the printer driver generates a print job described in a page description language (PDL). Examples of the PDL includes PostScript (PS), Printer Command Language (PCL), and Laser Beam Printer Image Processing System (LIPS®). In addition, the PC 200 includes a control unit such as a central processing unit (CPU), and a storage unit such as a read-only memory (ROM), a random access memory (RAM) (rewritable memory), and a hard disk drive (HDD). The printer driver transmits the generated print job to the image forming apparatus 100 via a network.

The image forming apparatus 100 is controlled by a CPU 202, and the CPU 202 operates based on a program stored in a RAM 204. A ROM 203 is a boot ROM, and stores a boot program of the system. A storage unit 205 stores system software, image data, and programs for controlling the operations of the image forming apparatus 100. The programs stored in the storage unit 205 are loaded onto the RAM 204, and the CPU 202 controls the operations of the image forming apparatus 100 based on the programs. In the following description, unless otherwise stated, each step of a control process of the image forming apparatus 100 is executed by the CPU 202.

An image processing unit 209 performs image processing on image data received via the network I/F 206, and performs image processing on image data input or output via a device I/F 207. Image data transmitted from the PC 200 is converted by the image processing unit 209 into raster-format image data, and stored into the storage unit 205. The stored image data is transmitted to the printer engine 110 via the device I/F 207 as a video signal, and used in an image formation operation to be executed by the printer engine 110.

In addition, the image forming apparatus 100 includes an operation display unit 210 that servers as a display unit that displays information to the user and an input unit that receives an instruction from the user. The operation display unit 210 includes a screen display unit including a display such as a liquid crystal display (LCD) and an operation input unit including a touch panel that is installed on the display, and functions as a software key based on a positional relationship between an original position of an operation target displayed on the display and a position of the operation target operated on the display, and a hardware key such as a numerical keypad.

Further, the CPU 202 of the image forming apparatus 100 controls a sheet feeding unit 208 including sheet feeding decks such as the sheet feeding cassettes 102 to 105 and the manual feeding tray 106. The details of the sheet feeding unit 208 will be described below.

Figure 3:
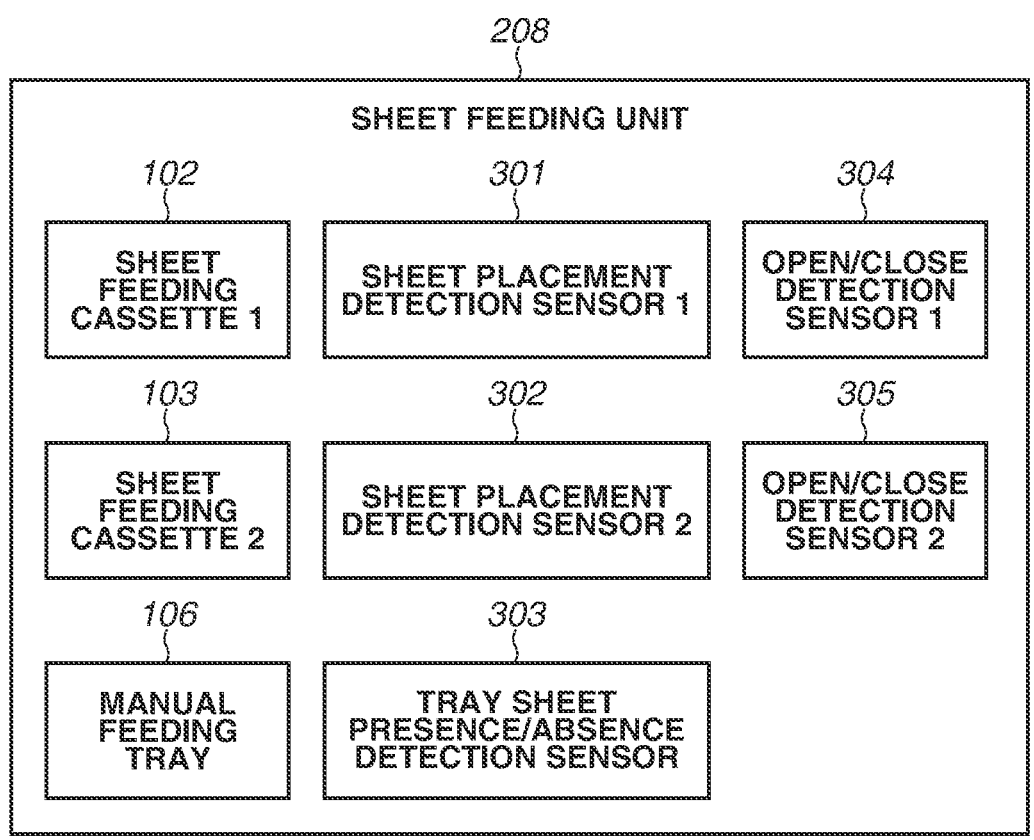
FIG. 3 is a diagram illustrating the details of a sheet feeding unit according to the first exemplary embodiment.

FIG. 3 is a functional block diagram illustrating the details of the sheet feeding unit 208 of the image forming apparatus 100. The sheet feeding unit 208 supplies sheets to the printer engine 110. The CPU 202 controls the sheet feeding cassette 1 (102) to the sheet feeding cassette 4 (105) and the manual feeding tray 106 in the sheet feeding unit 208 to feed sheets from any of the sheet feeding cassettes or the manual feeding tray as a sheet feeding deck. On the sheet feeding cassettes 1 and 2 (102 and 103), sheet placement detection sensors 1 and 2 (301 and 302) that detect sheet installed levels on the respective cassettes are installed. By using the sheet placement detection sensors 1 and 2 (301 and 302), the CPU 202 can detect that no sheet is currently set on a corresponding sheet feeding cassette, or in a case where sheets are set, the CPU 202 can detect a sheet installed level in several levels. Similarly, on the sheet feeding cassettes 1 and 2 (102 and 103), open/close detection sensors 1 and 2 (304 and 305) for detecting opened/closed states of the respective sheet feeding cassettes are installed. By using the open/close detection sensors 1 and 2 (304 and 305), the CPU 202 can detect in real time that the sheet feeding cassettes have been opened or closed, as an event from the open/close detection sensors 1 and 2 (304 and 305). On the sheet feeding cassette 3 (104) and the sheet feeding cassette 4 (105), sheet placement detection sensors and open/close detection sensors are installed in a similar manner, but the illustration is omitted in FIG. 3.

A tray sheet presence/absence detection sensor 303 that detects whether or not a sheet is placed on a tray is installed on the manual feeding tray 106. By using the tray sheet presence/absence detection sensor 303, the CPU 202 can detect in real time that a sheet has been placed on the manual feeding tray 106 or removed from the manual feeding tray 106, as an event from the tray sheet presence/absence detection sensor 303.

(Flow of Image Formation)

A flow of processing to be performed when image formation is executed in the present exemplary embodiment will be described. In the present exemplary embodiment, sheet feeding deck reservation processing is performed before execution of image formation. The sheet feeding deck reservation is a setting for imposing usage restrictions on the sheet feeding cassettes and the manual feeding tray on which sheets to be used in image formation are installed. The details will be described below. After the sheet feeding deck reservation processing, the PC 200 generates a print job by printer driver processing, and outputs the generated print job to the image forming apparatus 100. If the print job is input to the image forming apparatus 100, the image forming apparatus 100 processes the print job by executing printer processing. Next, the details of each processing will be described.

(Sheet Feeding Deck Reservation)

Figure 4:
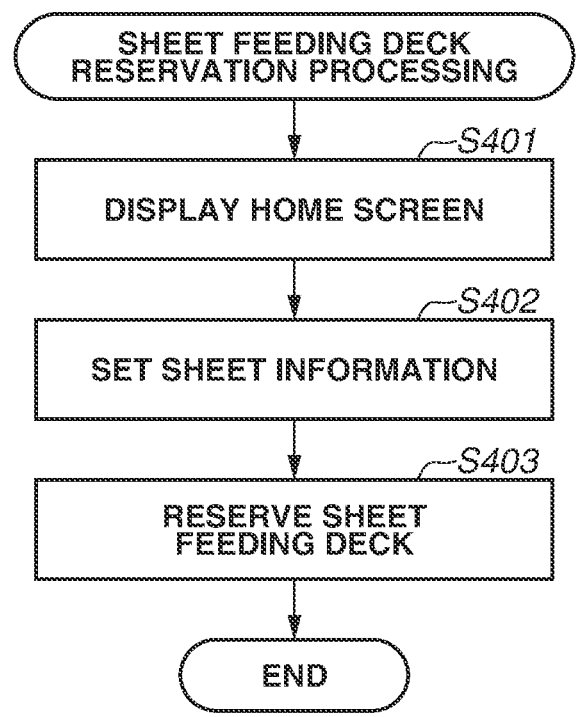
FIG. 4 is a flowchart illustrating sheet feeding deck reservation processing of print processing according to the first exemplary embodiment.

The sheet feeding deck reservation processing will be described with reference to a flowchart in FIG. 4. The description will be given assuming that the user performs an operation of installing the following special sheet on the sheet feeding cassette 102, and making a reservation.

Sheet size: A4
Sheet type: coated paper

First of all, the user installs the above-described special sheet on the sheet feeding cassette 102. Subsequently, to set a sheet size and a sheet type for the sheet feeding cassette 102 on which the sheet has been installed, the user operates the operation display unit 210 of the image forming apparatus 100.

Figure 5:
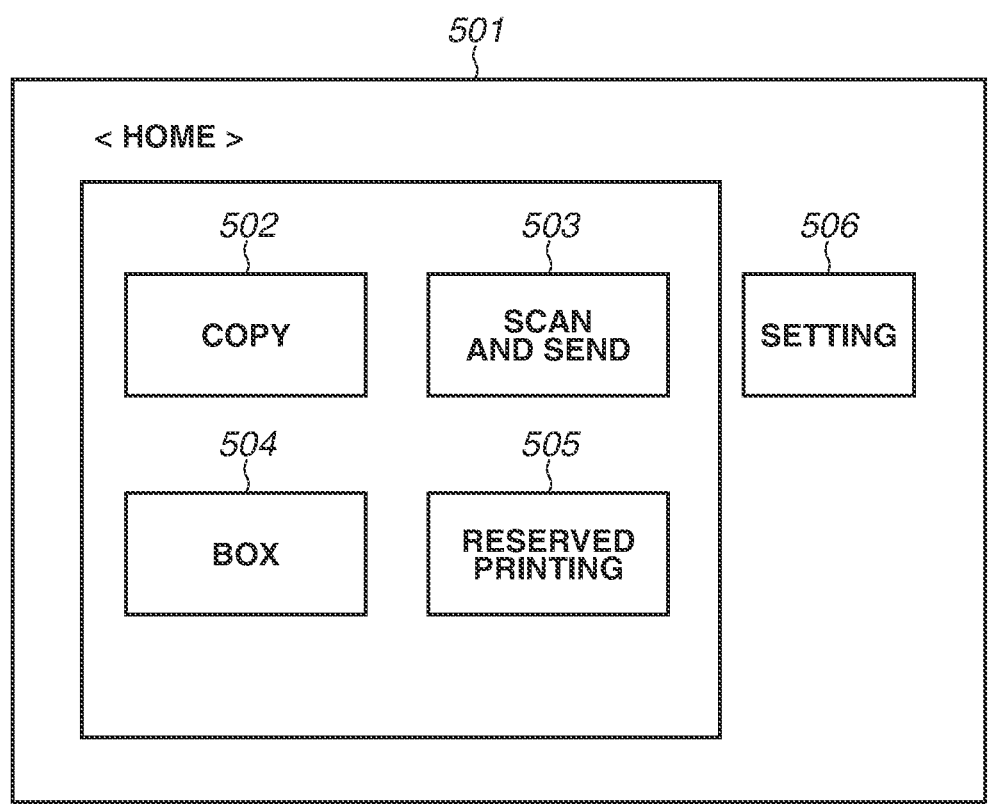
FIG. 5 is a diagram illustrating an example of a home screen of the image forming apparatus according to the first exemplary embodiment.
Figure 6:
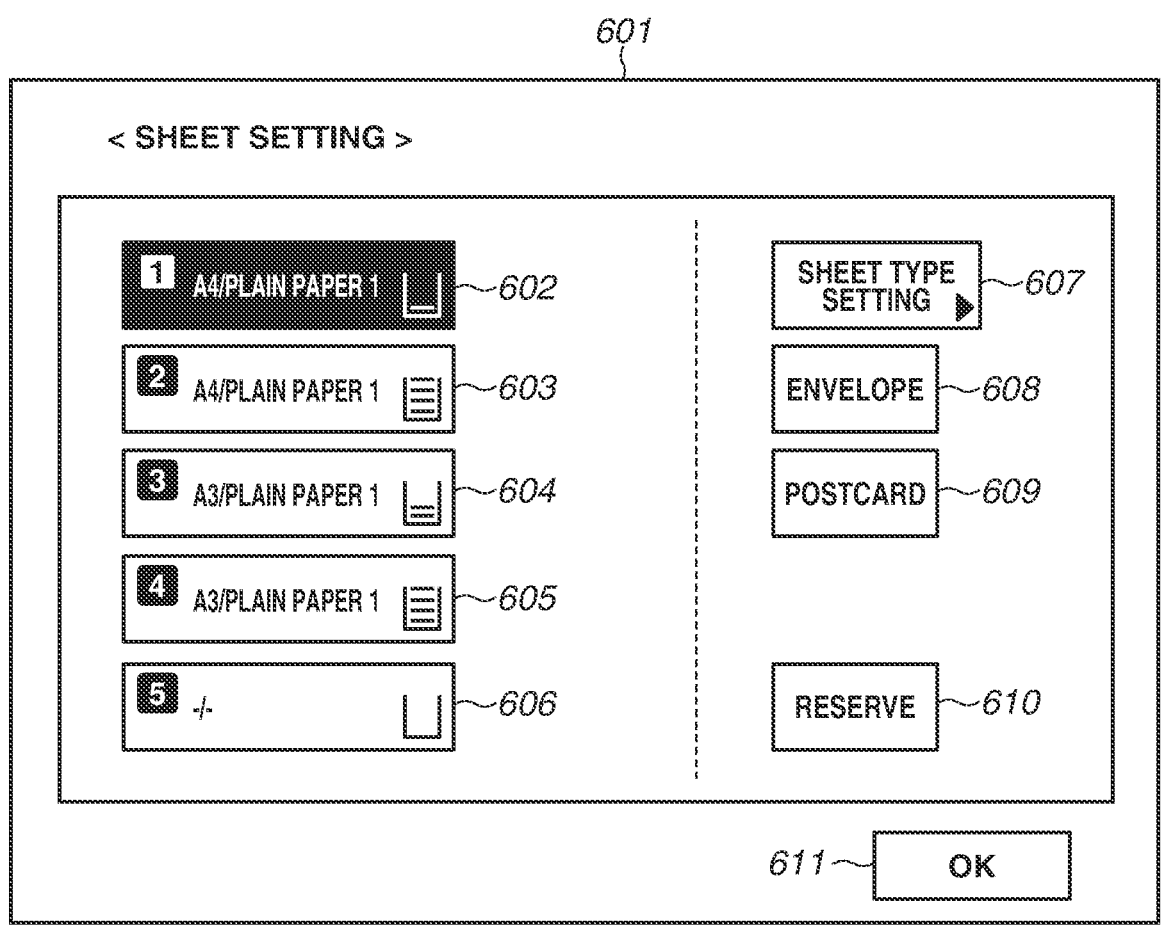
FIG. 6 is a diagram illustrating an example of a sheet setting screen of the image forming apparatus according to the first exemplary embodiment.

In step S401, the CPU 202 of the image forming apparatus 100 displays a home screen 501 illustrated in FIG. 5, on the operation display unit 210, and waits for an operation from the user. A button 502 to be selected in a case where a copy function is to be used, a button 503 to be selected in a case where a transmission function is to be used, and a button 504 to be selected in a case where a box function is to be used are arranged on the home screen 501. In addition, a button 505 is a button to be selected in a case where a reserved printing function is to be used. A setting button 506 is a button for making various settings of the image forming apparatus 100. The setting button 506 is pressed also in a case where the user sets the above-described size and type of the installed sheets, and reserves a sheet feeding deck. If the CPU 202 of the image forming apparatus 100 detects that the setting button 506 has been pressed, the CPU 202 displays a screen (not illustrated) for prompting the user to select various setting items. If the CPU 202 detects that a button for making a sheet setting has been pressed from among the various setting items, then in step S402, the CPU 202 displays a sheet setting screen 601 for making a sheet setting as illustrated in FIG. 6. Sheet feeding deck selection buttons 602 to 606 are displayed on the sheet setting screen 601, and a setting status of each sheet feeding deck is displayed in a corresponding button. Each display content will be described below. In addition, a button 607 for changing a sheet type, and buttons 608 and 609 for setting a sheet size to special sizes such as envelope or postcard, and a reservation button 610 are arranged on the sheet setting screen 601. In addition, the buttons (setting buttons) 607 to 610 are operated after any of the sheet feeding deck selection buttons 602 to 606 is selected.

The display of a setting status of each sheet feeding deck will be described in detail. The setting status of each sheet feeding deck is held in the storage unit 205 of the image forming apparatus 100 as sheet feeding deck information as indicated in Table 1 provided below. In Table 1, a sheet size (3002) is a size automatically detected or a size set by the user when a sheet is installed on each sheet feeding deck. A sheet type (3003) is a type set using the button 607, and a sheet remaining amount (3004) indicates a detected remaining amount of each sheet feeding deck in five levels. Furthermore, a reservation state (3005) in Table 1 indicates a reservation state of each sheet feeding deck. If a specific button is selected from among the buttons 602 to 606, and then the reservation button 610 is selected, the state of a cassette corresponding to the specific button is set to a "reserved" state. In the example in Table 1 provided below, all fields of the reservation state (3005) are blank, and this indicates that the sheet feeding decks are in a state of being available to anyone (unreserved state).

TABLE 1

Setting Status of Each Sheet Feeding Deck

| Sheet feeding deck (3001) | Sheet size (3002) | Sheet type (3003) | Sheet remaining amount (3004) | Reservation state (3005) |
|---|---|---|---|---|
| Manual feeding tray 106 | Unset | Unset | 0% | — |
| Sheet feeding cassette 105 | A3 | Plain paper 1 | 100% | — |
| Sheet feeding cassette 104 | A3 | Plain paper 1 | 50% | — |
| Sheet feeding cassette 103 | A4 | Plain paper 1 | 100% | — |
| Sheet feeding cassette 102 | A4 | Plain paper 1 | 25% | — |

Figure 7:
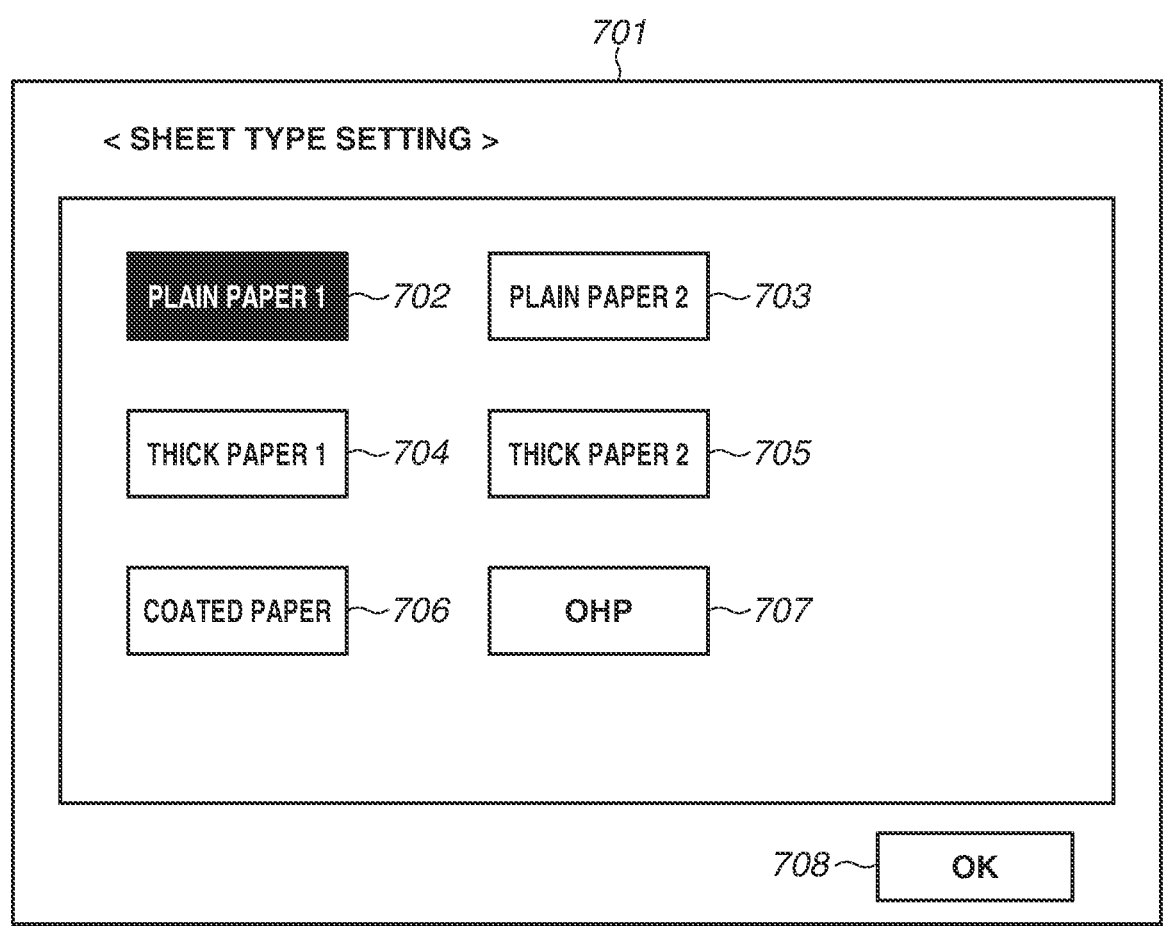
FIG. 7 is a diagram illustrating an example of a sheet type setting screen of the image forming apparatus according to the first exemplary embodiment.

Next, the description will be given of an operation to be performed when a certain sheet feeding deck is selected (for the sake of explanatory convenience, it is assumed that the button 602 corresponding to the sheet feeding cassette 102 is selected), and the button 607 is pressed. If the CPU 202 of the image forming apparatus 100 detects that the button 607 has been pressed, the CPU 202 display a sheet type setting screen 701 illustrated in FIG. 7, on the operation display unit 210. Then, the CPU 202 acquires a sheet type set for the selected sheet feeding deck (in this example, the sheet feeding cassette 102), from the sheet feeding deck information held in the storage unit 205, and displays the sheet type. FIG. 7 illustrates a state in which plain paper 1 (702) is set. Aside from the plain paper 1 (702), thick paper 1 (704), coated paper (706), and other types of paper are arranged on the sheet type setting screen 701. If the user selects a sheet type and presses an OK button 708 on the sheet type setting screen 701, the CPU 202 detects the press of the OK button 708, updates the sheet feeding deck information, and completes the sheet type setting.

The home screen 501, the sheet setting screen 601, and the sheet type setting screen 701 may be screens to be displayed on the operation display unit 210 of the image forming apparatus 100, or may be screens to be displayed on a display of the PC 200 connected with the image forming apparatus 100 via a network 201.

Next, an operation for reserving a sheet feeding deck will be described. For the sake of explanatory convenience, it is assumed that the sheet feeding cassette 102 is to be reserved. In step S403, if the CPU 202 of the image forming apparatus 100 detects that the reservation button 610 has been pressed in a state in which the button 602 corresponding to the sheet feeding cassette 102 is selected, the CPU 202 records "reserved" in a reservation state field in the sheet feeding deck information held in the storage unit 205. Accordingly, sheet feeding from the sheet feeding cassette 102 becomes executable only in a job for which the usage of a reserved sheet feeding deck is set in step S805 to be described below. In a case where the reservation is to be cancelled, the cancel is performed by pressing the reservation button 610 again. In this case, the reservation state field in the sheet feeding deck information held in the storage unit 205 is cleared. A specific sheet feeding operation for a reserved sheet feeding deck will be described below in sheet feeding determination processing.

Table 2 indicates a setting status of each sheet feeding deck after the above-described sheet type change and reservation processing have been performed.

By the selection of the reservation button 610, a reservation state of the sheet feeding cassette 102 is set to "reserved".

TABLE 2

Setting Status of Each Sheet Feeding Deck

| Sheet feeding deck (3001) | Sheet size (3002) | Sheet type (3003) | Sheet remaining amount (3004) | Reservation state (3005) |
|---|---|---|---|---|
| Sheet feeding cassette 102 | A4 | Coated paper | 25% | Reserved |
| Sheet feeding cassette 103 | A4 | Plain paper 1 | 100% | — |
| Sheet feeding cassette 104 | A3 | Plain paper 1 | 50% | — |
| Sheet feeding cassette 105 | A3 | Plain paper 1 | 100% | — |
| Manual feeding tray 106 | Unset | Unset | 0% | — |

(Printer Driver Processing)

Next, printer driver processing will be described with reference to a flowchart in FIG. 8. Each of the following steps is implemented by a control unit, such as a CPU that is included in the PC 200, executing a program included in the printer driver. The printer driver processing is started in a case where the user of the PC 200 performs an operation of issuing a printing execution instruction to the document creation application, for example. In step S801, document data indicating content (document, figure, or the like) to be printed is preliminarily generated using the document creation application.

Figure 9:
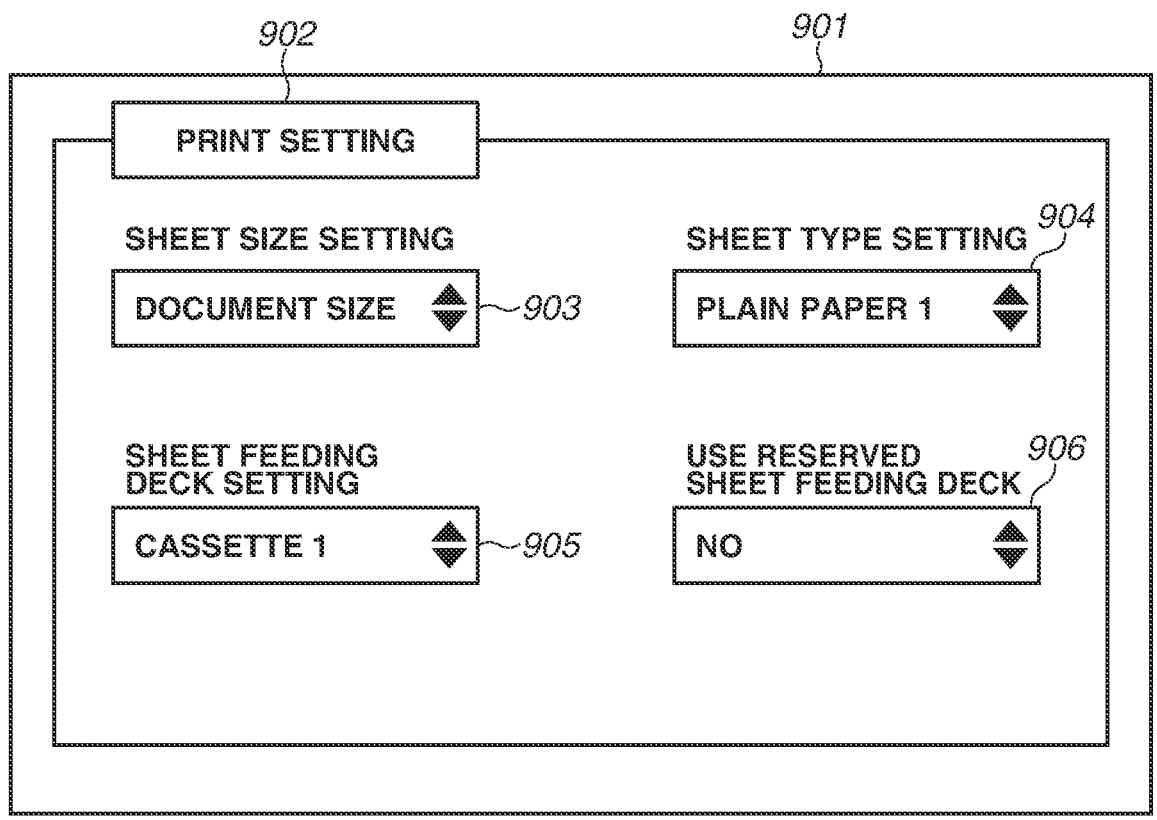
FIG. 9 is a diagram illustrating an example of a printing condition setting screen that is to be displayed by driver software according to the first exemplary embodiment.

In steps S802 to S805, based on user operation signals input to the PC 200, setting processing for setting attribute information of a print job is performed. Specifically, as illustrated in FIG. 9, a print setting screen 901 for setting a printing condition is displayed on the display of the PC 200, and the PC 200 enters a state of receiving a user operation. A tab 902 indicates that the print setting screen 901 is a screen for making a print setting.

A setting value of a sheet size is displayed in a sheet size setting field 903, a setting value of a sheet type is displayed in a sheet type setting field 904, and a sheet feeding deck to be designated as a sheet supply source is displayed in a sheet feeding deck setting field 905. As sheet sizes, "document size" for designating the same size as the original document data, a standard size such as "A4", and a user-defined size to be set by the user entering a numerical value are selectable. As sheet types, setting values such as "plain paper 1", "plain paper 2" with a grammage larger than that of the "plain paper 1", and "coated paper" are selectable. As a sheet feeding deck, any of the sheet feeding cassettes 102 to 105 and the manual feeding tray 106 is selectable. In some cases, an option such as "automatic selection" for entrusting selection to an image forming apparatus is provided as options for a sheet type and a sheet feeding deck. Furthermore, in the tab 902, a setting button 906 for setting whether or not to use a sheet installed on a reserved sheet feeding deck is displayed.

By selecting "YES" in this setting, printing can be performed using sheets installed on a reserved sheet feeding deck (described below).

Based on a user operation signal input via the print setting screen 901, the driver software sets a sheet size, a sheet type, and information for designating a sheet feeding deck from which sheets are to be fed, and the usage of a reserved sheet feeding deck.

Subsequently, in steps S806 and S807, the printer driver sets an owner name and a document name of a print job. The owner name is information for identifying a user who has created the print job. In the present exemplary embodiment, an ID of a user who has currently logged in to the PC 200 is used as the owner name. The document name is information for identifying a data file of a document or a figure that is to be printed, and is acquired from an application that has generated document data, for example.

Then, in step S808, the printer driver generates PDL data conforming to a format of a PDL, based on the document data and various types of setting information. The PDL data includes page data indicating content to be drawn on each page, and setting information (sheet size/sheet type/sheet feeding deck/owner name/document name, etc.) of the print job. The page data is image information generated by the printer driver from the document data in conformity to the format of the PDL. In step S809, the generated PDL data is transmitted to the image forming apparatus 100 via a network.

(Printer Processing)

Figure 10:
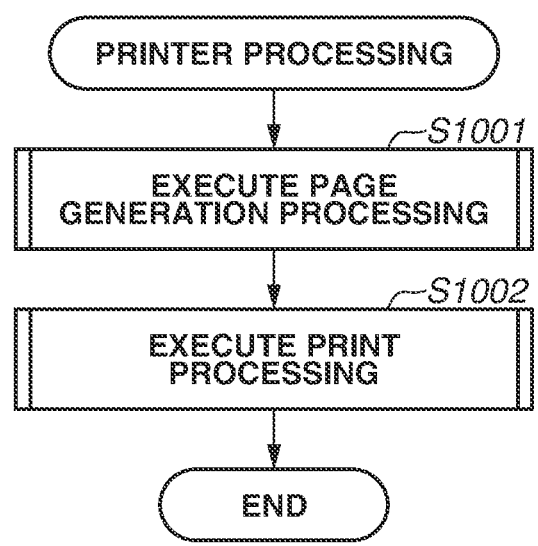
FIG. 10 is a flowchart illustrating printer processing to be executed by the image forming apparatus according to the first exemplary embodiment.

If a signal indicating PDL data reaches the image forming apparatus 100, the CPU 202 of the image forming apparatus 100 starts printer processing. As illustrated in FIG. 10, the printer processing broadly includes page generation processing of generating image data of each page (S1001), and print processing of forming an image on a sheet based on the image data (S1002).

Figure 11:
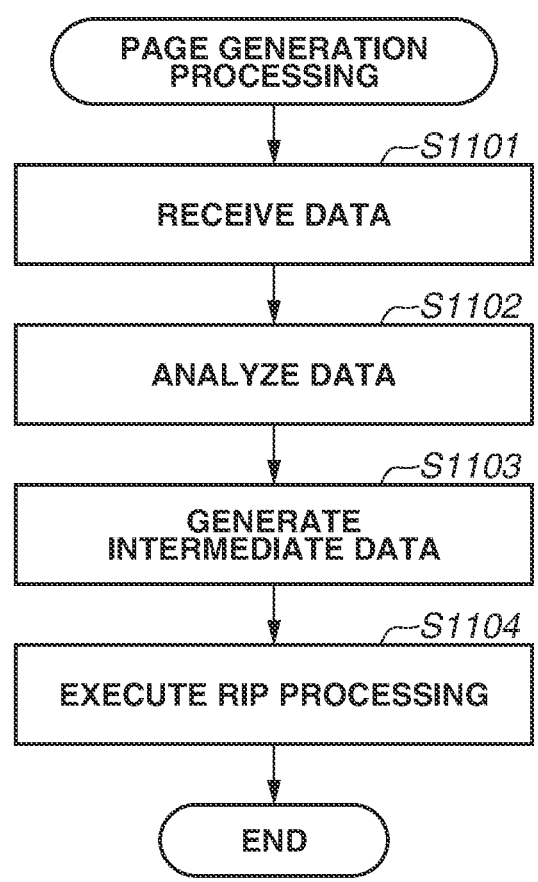
FIG. 11 is a flowchart illustrating the details of page generation processing in the printer processing according to the first exemplary embodiment.

First of all, the details of the page generation processing will be described with reference to a flowchart in FIG. 11. In step S1101, a print job transmitted from the PC 200 is temporarily stored into the storage unit 205. The print job stored in the storage unit 205 includes page data as image information conforming to the format of the PDL. In step S1102, the page data is analyzed by the CPU 202. In step S1103, the page data is converted into intermediate data. The intermediate data collectively refers to drawing objects such as bitmap, run length, trapezoid, box, and high-speed boundary encoded bitmap, a background pattern, and a drawing logic for drawing a raster-format image from these. In addition, print job setting information such as a sheet size that is included in the PDL data is also extracted through the analysis executed by the CPU 202, and stored into the storage unit 205.

In step S1104, the image processing unit 209 performs raster image processing (RIP) on the intermediate data, and stores resultant data into the storage unit 205. The RIP refers to processing of generating raster-format image data from image data of a vector image or the like.

Figure 12:
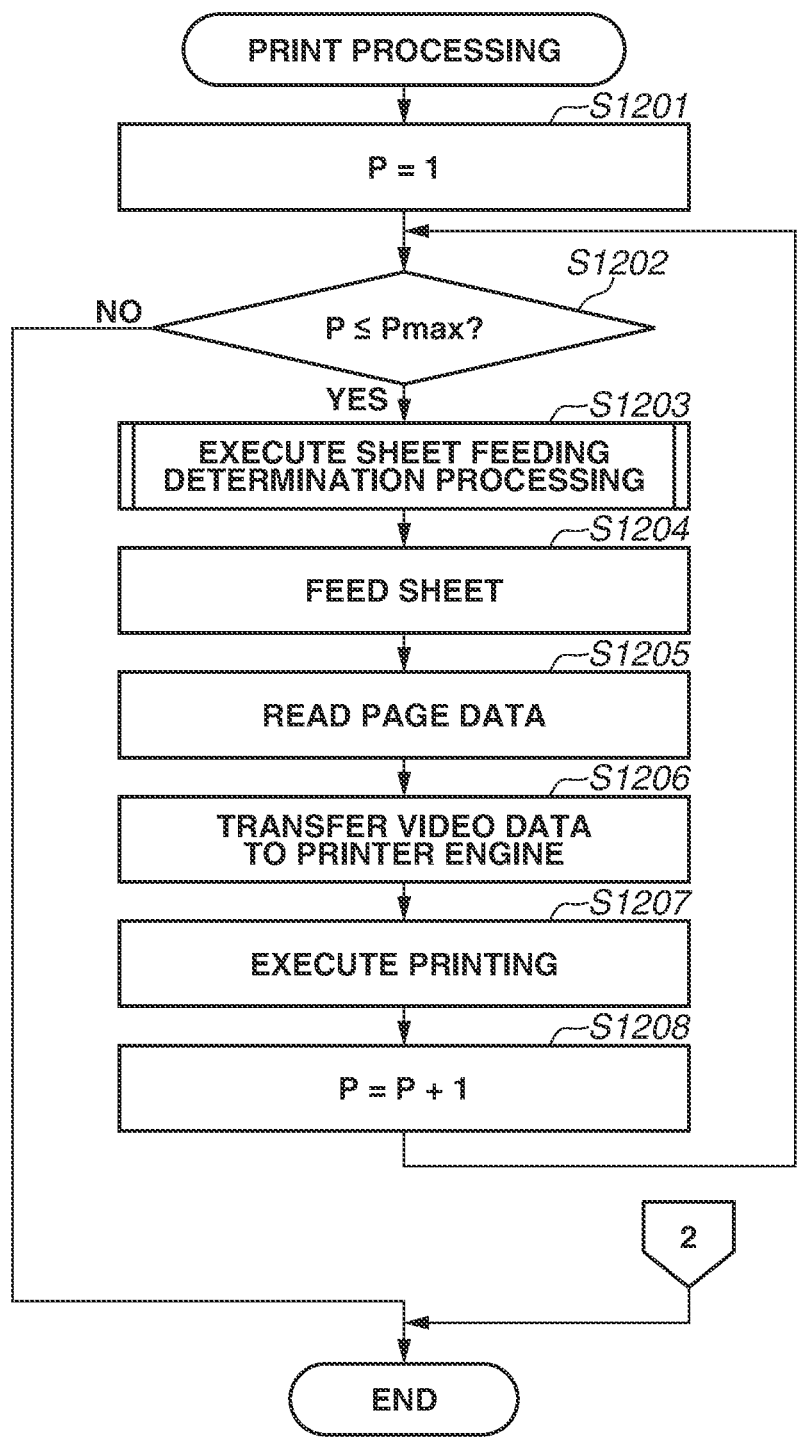
FIG. 12 is a flowchart illustrating the details of print processing in the printer processing according to the first exemplary embodiment.

Subsequently, the details of the print processing will be described with reference to a flowchart in FIG. 12. If the image forming apparatus 100 starts print processing upon receiving a print job execution instruction, then in step S1201, the CPU 202 initializes a parameter P indicating a page (current sheet) being processed. The print job execution instruction may be received from the PC together with PDL data, or may be received from the user via the operation display unit 210 of the image forming apparatus 100. The parameter P is an integer value satisfying $P \geq 1$. In step S1202, the CPU 202 determines whether the parameter P exceeds a variable Pmax indicating the total number of pages (the number of sheets designated by the print job), and as long as $P \leq Pmax$ is satisfied (YES in step S1202), the CPU 202 repeatedly executes the following processing (steps S1203 to S1208). The variable Pmax is extracted by the analysis of PDL data and is stored in the storage unit 205.

First of all, in step S1203, the CPU 202 acquires information regarding a sheet feeding deck setting (refer to step S804 in FIG. 8) with reference to the storage unit 205 and performs sheet feeding determination processing of determining whether a sheet can be fed from a designated sheet feeding deck. The sheet feeding determination processing will be described in detail below. If it is determined by the sheet feeding determination processing that a sheet can be fed from the designated sheet feeding deck, then in step S1204, one sheet is fed. In step S1205, the CPU 202 reads out image data of a sheet being processed, from the storage unit 205. In step S1206, the CPU 202 converts the image data into video data, and transfers the video data to the printer engine 110. Then, in step S1207, print processing (image formation process) is executed on the sheet by the printer engine 110 based on the video data. In step S1208, the CPU 202 increments the parameter P.

If image formation on sheets corresponding to the total number of pages (Pmax) ends (NO in step S1202), the print processing is ended.

(Sheet Feeding Determination Processing)

Figure 13:
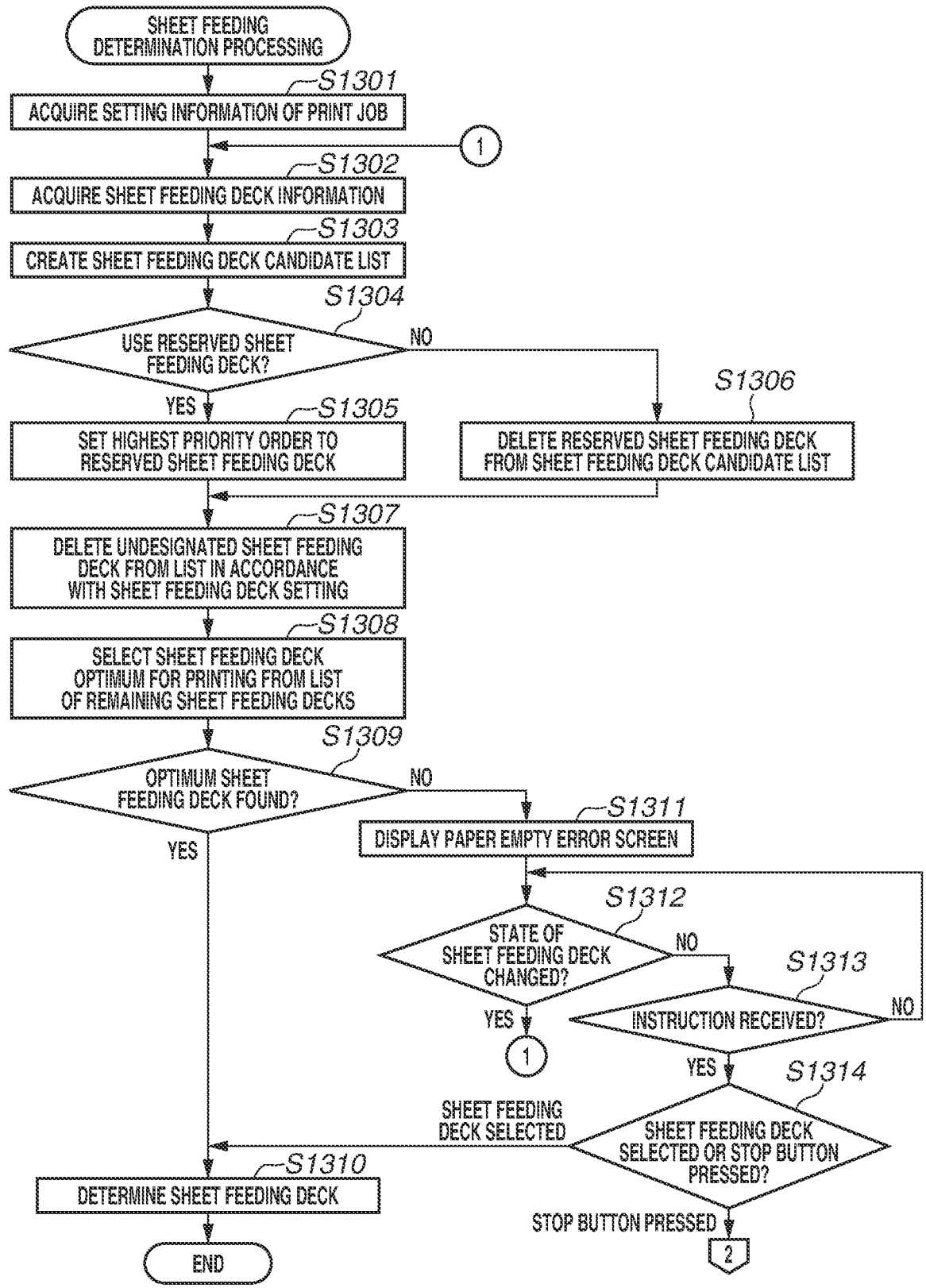
FIG. 13 is a flowchart illustrating the details of sheet feeding determination processing in the print processing according to the first exemplary embodiment.

Next, the sheet feeding determination processing (step S1203) will be described with reference to a flowchart in FIG. 13.

In the sheet feeding determination processing, in step S1301, the CPU 202 initially acquires setting information of a print job that has been stored into the storage unit 205 in step S1102. The print job setting information includes a sheet size and a sheet type that are necessary for printing, sheet feeding deck setting information, and setting information indicating whether to use a reserved sheet feeding deck. Next, in step S1302, the CPU 202 acquires sheet feeding deck information stored in the storage unit 205. The sheet feeding deck information is setting information about each sheet feeding deck that is indicated in Table 2 provided above. In step S1303, the CPU 202 creates a sheet feeding deck candidate list by copying the acquired sheet feeding deck information, and uses the sheet feeding deck candidate list for identifying candidate sheet feeding decks from which sheets are to be fed, in the following processing.

Next, in step S1304, the CPU 202 switches the next operation depending on the content of the setting information about the usage of a reserved sheet feeding deck for the print job that has been acquired in step S1301 described above. In a case where "YES" is set to use a reserved sheet feeding deck in the print job (YES in step S1304), the processing proceeds to step S1305. In step S1305, the CPU 202 rearranges the sheet feeding decks in the sheet feeding deck candidate list created in step S1303 in such a manner that a sheet feeding deck of which the reservation state (3005) is "reserved" comes at the top of the sheet feeding deck candidate list. Accordingly, it becomes possible to preferentially select the reserved sheet feeding deck in optimum sheet feeding deck selection (step S1308) to be described below. In the processing in step S1305, the CPU 202 may exclude an "unreserved" sheet feeding deck from the candidates instead of rearranging the sheet feeding decks in accordance with priority orders.

On the other hand, in a case where "NO" is set to not use the reserved sheet feeding deck in the print job (NO in step S1304), the processing proceeds to step S1306. In step S1306, the CPU 202 deletes a sheet feeding deck of which the reservation state (3005) is "reserved", from among the sheet feeding decks in the sheet feeding deck candidate list. For example, in a case where reservation statuses of the sheet feeding decks are as indicated in Table 2 and "NO" is set to not use the reserved sheet feeding deck in the print job, the CPU 202 deletes the sheet feeding cassette 102 from the sheet feeding deck candidate list. On the other hand, "Yes" is set to use the reserved sheet feeding deck in the print job, the CPU 202 deletes no sheet feeding deck from the sheet feeding deck candidate list. With this configuration, sheet feeding from a sheet feeding deck of which the reservation state (3005) is "reserved" becomes executable only in a job for which "YES" is set to use a reserved sheet feeding deck.

Next, in step S1307, the CPU 202 refers to the sheet feeding deck setting information included in the print job setting information acquired in step S1301 described above, and deletes a sheet feeding deck other than the designated sheet feeding deck from the sheet feeding deck candidate list.

The sheet feeding deck setting information is information designated in the above-described sheet feeding deck setting field 905. In a case where a specific sheet feeding deck is designated in the sheet feeding deck setting field 905, the CPU 202 deletes a sheet feeding deck other than the designated sheet feeding deck from the sheet feeding deck candidate list. In a case where automatic selection is set, the CPU 202 deletes no sheet feeding deck from the sheet feeding deck candidate list.

Next, in step S1308, the CPU 202 selects an optimum sheet feeding deck from among sheet feeding decks remaining in the sheet feeding deck candidate list. Specifically, the CPU 202 searches the sheet feeding deck candidate list for a sheet feeding deck holding a sheet conforming to the sheet size and the sheet type necessary for printing that are described in the print job setting information, in order from the topmost sheet feeding deck. In step S1309, the CPU 202 switches the next processing depending on a search result of the sheet feeding deck. If the optimum sheet feeding deck is found (YES in step S1309), the processing proceeds to step S1310. In step S1310, the CPU 202 determines the sheet feeding deck and notifies a subsequent flow of processing of the sheet feeding deck, and the sheet feeding determination processing is ended. In this example, the sheet feeding deck found first in the search is set as a sheet feeding deck to be used in the job.

On the other hand, in a case where it is determined in step S1309 that the optimum sheet feeding deck is not found (NO in step S1309), the processing proceeds to step S1311. In step S1311, the CPU 202 displays a paper empty error screen 1401 illustrated in FIG. 14, on the operation display unit 210 of the image forming apparatus 100. A message 1409 indicating information (size and type) regarding a sheet necessary for continuing a print job and a sheet feeding deck on which the sheet can be installed is displayed on the paper empty error screen 1401. The CPU 202 searches the sheet feeding deck candidate list processed in step S1307, for the sheet feeding deck on which the sheet can be installed.

The paper empty error screen 1401 displayed in step S1309 may be always the same screen when an optimum sheet feeding deck is not found, or may be switched depending on a condition. For example, in a case where a sheet feeding deck designated in a print job is a reserved sheet feeding deck although "NO" is set to not use a reserved sheet feeding deck in the print job, the CPU 202 may display information indicating that a sheet feeding deck designated in a print job is reserved. At this time, the message 1409 may be displayed together. Furthermore, in a case where a sheet feeding deck is not designated in a print job but a sheet feeding deck identified based on a sheet size designated in the print job corresponds only to a reserved sheet feeding deck although "NO" is set to not user a reserved sheet feeding deck in the print job, the CPU 202 may display another screen. Specifically, the CPU 202 may display a screen including a message indicating that sheet feeding decks in which designated-sized sheets are stored are all reserved. At this time, the message 1409 may be displayed together as well. Then, in a case where "YES" is set to use a reserved sheet feeding deck in a print job and a sheet feeding deck designated in the print job is a reserved sheet feeding deck, but no sheet is placed on the sheet feeding deck, the CPU 202 may display the paper empty error screen 1401 illustrated in FIG. 14.

Figure 14:
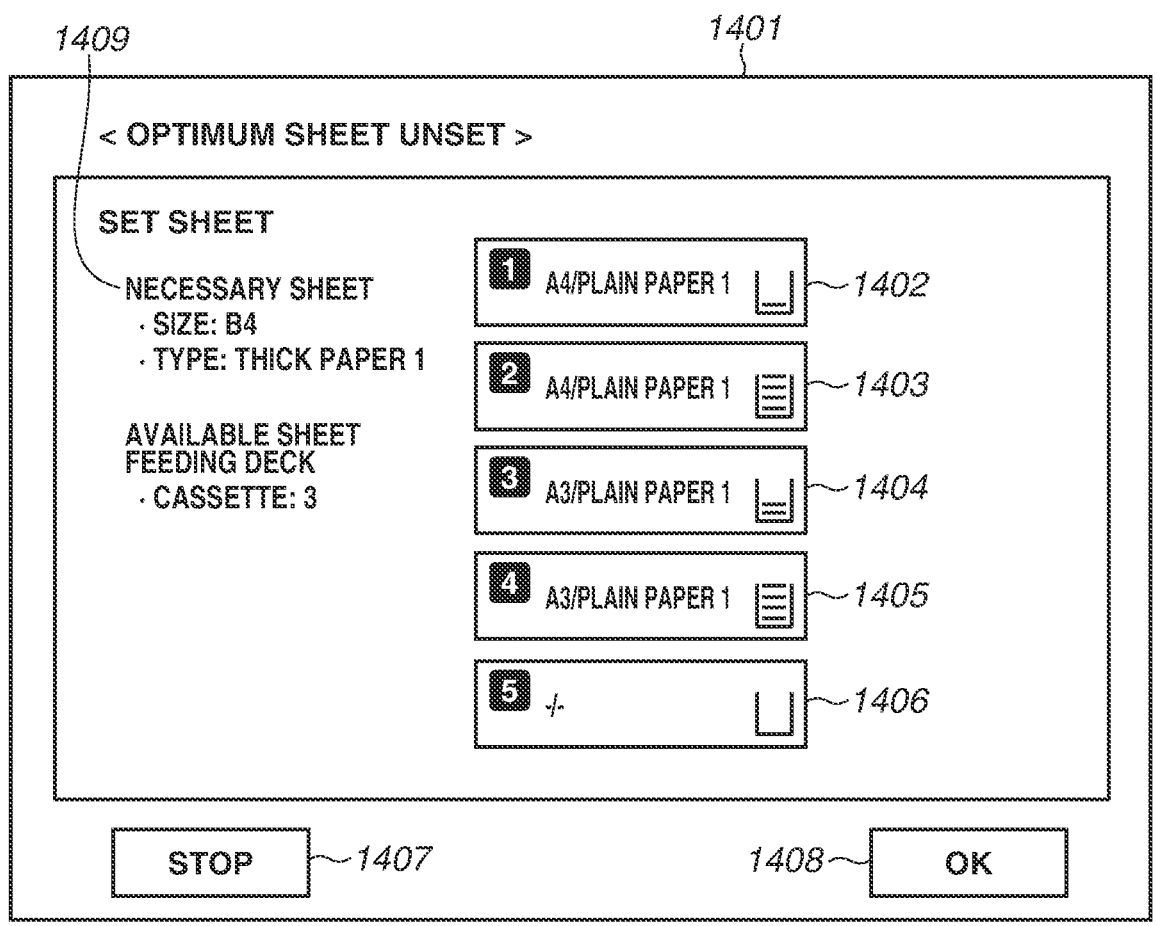
FIG. 14 is a diagram illustrating an example of a paper empty error screen of the image forming apparatus according to the first exemplary embodiment.

An operation executable by the user in a case where the paper empty error screen 1401 illustrated in FIG. 14 is displayed is any of the following operations.

Resolve a paper empty error by setting a sheet described in the message 1409 (B4, thick paper 1 in FIG. 14) in a sheet feeding deck described in the message 1409 (cassette 3 in FIG. 14).

Press any of sheet feeding deck selection buttons 1402 to 1406, and forcibly continue processing using a sheet and a sheet feeding deck different from the sheet and the sheet feeding deck designated in the message 1409.

Stop the print job by pressing a stop button 1407.

The CPU 202 waits for any of the above-described operations to be performed by the user. In step S1312, the CPU 202 determines whether any change occurs in the states of sheet feeding decks. In a case where any change occurs in the states of sheet feeding decks (YES in step S1312), the CPU 202 determines that a sheet might be installed by the user, and the processing proceeds to step S1302. The CPU 202 then performs search processing of an optimum sheet feeding deck again. The change in the states of sheet feeding decks includes a change in a sheet size of sheets placed on a specific sheet feeding deck, and a change in a size or a type of sheets set on a sheet feeding deck.

In a case where no change occurs in the states of sheet feeding decks (NO in step S1312), the processing proceeds to step S1313. In step S1313, the CPU 202 determines whether an instruction issued by the user via the operation display unit 210 has been detected. In a case where an instruction issued by the user via the operation display unit 210 has been detected (YES in step S1313), the processing proceeds to step S1314. In step S1314, the CPU 202 switches processing to be performed the next, in accordance with the detected instruction. In a case where any of the sheet feeding deck selection buttons 1402 to 1406 has been selected ("SHEET FEEDING DECK SELECTED" in step S1314), the processing proceeds to step S1310. In step S1310, the CPU 202 notifies a subsequent flow of processing of the selected sheet feeding deck, and the sheet feeding determination processing is ended. On the other hand, in a case where the press of the stop button 1407 has been detected ("STOP BUTTON PRESSED" in step S1314), the print processing is ended.

In a case where it is determined in step S1309 that the optimum sheet feeding deck is not found (NO in step S1309), the CPU 202 may cancel the execution of the print job. Accordingly, a job in which the use of a reserved sheet feeding deck is not designated, and the reserved sheet feeding deck is to be used as the designated sheet feeding deck can be made inexecutable.

By executing the above-described processing, when executing a job in which the use of a reserved sheet feeding deck is not designated, it is possible to prevent the reserved sheet feeding deck from being automatically selected. Furthermore, when executing a print job in which the use of a reserved sheet feeding deck is not designated, by displaying an error in a case where a sheet feeding deck set for the print job is the reserved sheet feeding deck, it is possible to prevent the reserved sheet feeding deck from being erroneously used. In other words, it is possible to prevent sheets from being used in unintended printing. Furthermore, because sheet feeding deck reservation is performed independently of the execution of a print job, even if the execution of the print job is completed, a sheet feeding deck can be reserved in the long term without reservation being automatically cancelled.

A second exemplary embodiment will be described. A reserved sheet feeding deck in the first exemplary embodiment may be displayed on the display on the operation display unit 210 of the image forming apparatus 100 and on a screen of the printer driver that is to be displayed on the display of the PC 200 in the following manner.

Figure 15:
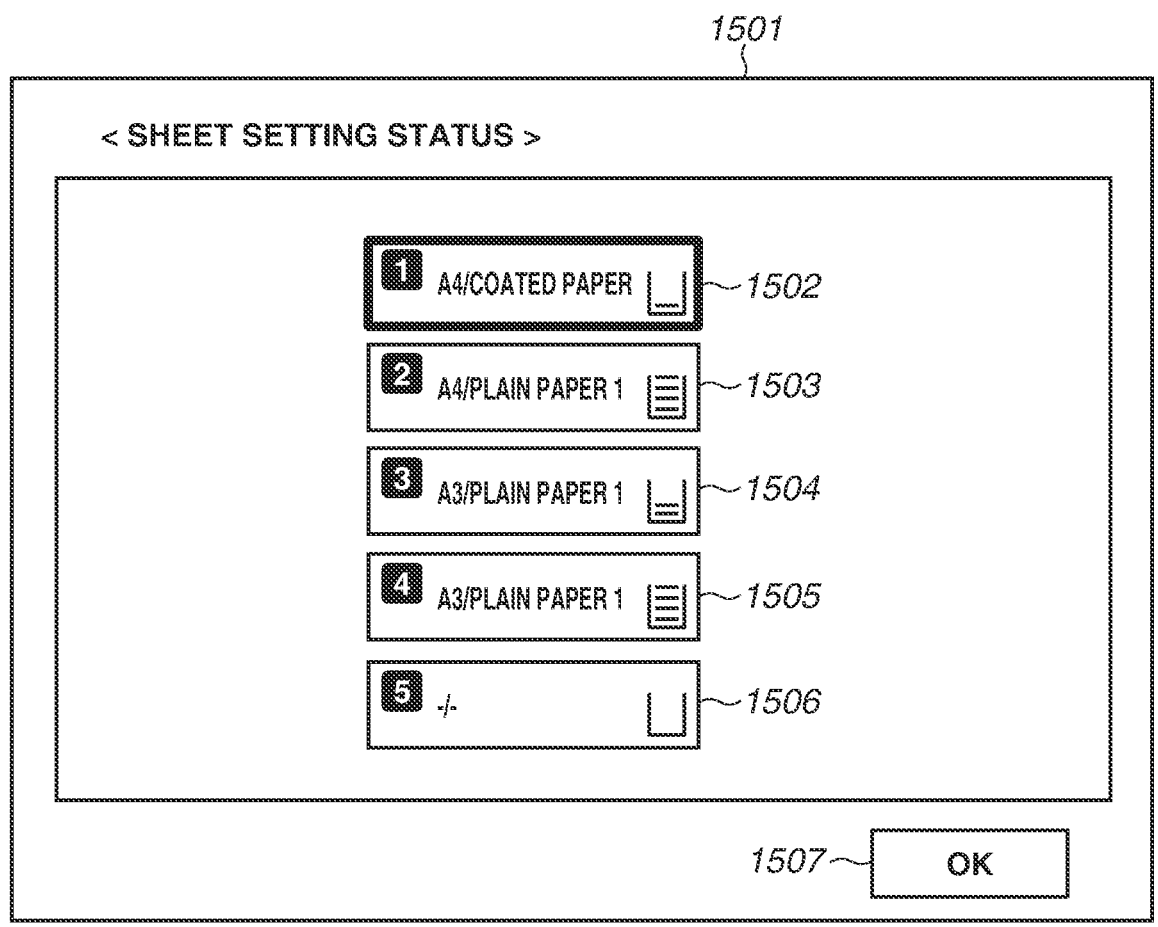
FIG. 15 is a diagram illustrating a display example of a sheet feeding deck reservation state of an image forming apparatus according to a second exemplary embodiment.
Figure 16:
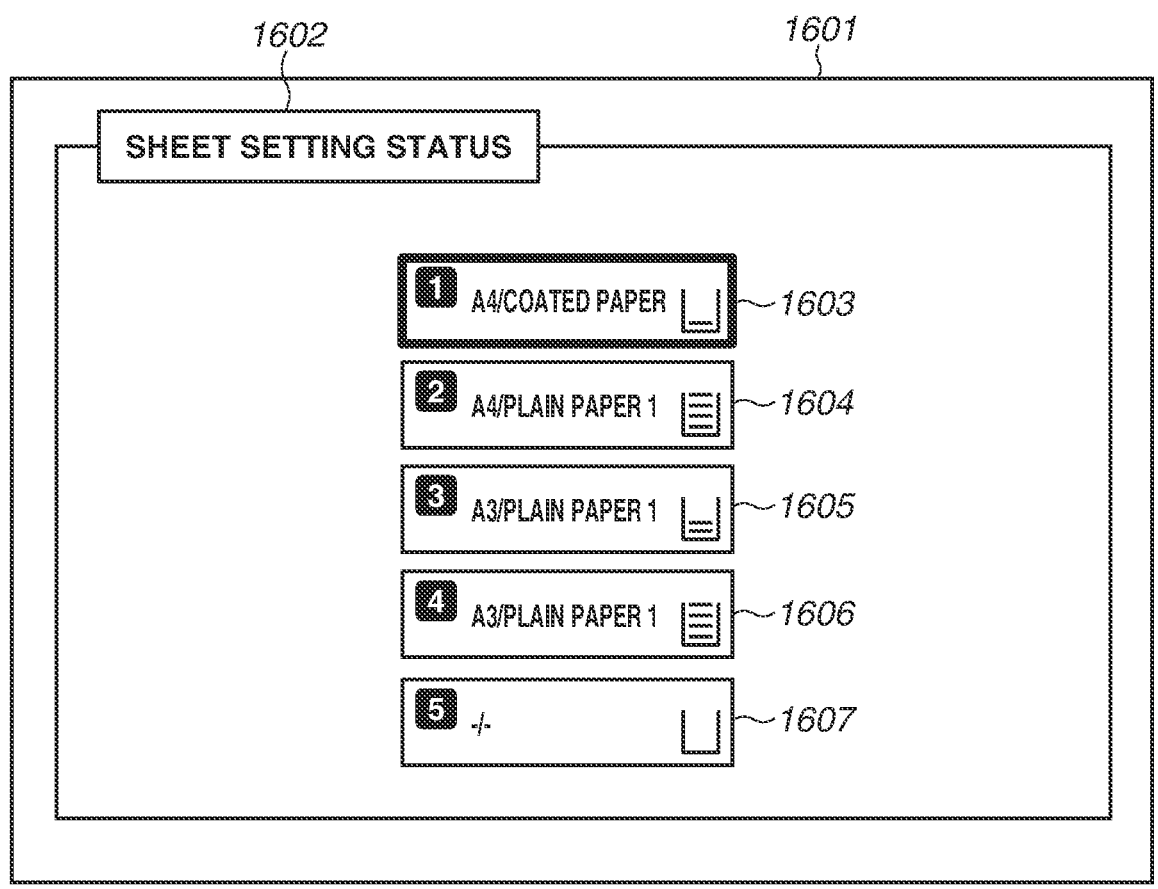
FIG. 16 is a diagram illustrating a display example of a sheet feeding deck reservation state of the image forming apparatus that is to be displayed by driver software according to the second exemplary embodiment.

FIG. 15 illustrates a display example of a reserved sheet feeding deck to be displayed on the operation display unit 210 of the image forming apparatus 100 in a case where the sheet feeding cassette 102 is reserved as indicated in Table 2 provided above. On a sheet setting status display screen 1501, a state 1502 of the sheet feeding cassette 102 is indicated by a bold line as compared with states 1503 to 1506 of the other sheet feeding cassettes. In this way, a reserved sheet feeding deck is displayed in an identifiable manner from other sheet feeding decks. In a similar manner, FIG. 16 illustrates a display example of sheet feeding decks in the printer driver that is to be displayed on the display of the PC 200. On a sheet setting status display screen 1601, a state 1603 of the sheet feeding cassette 102 is displayed using a bold line, and it can be understood that the sheet feeding cassette 102 is reserved.

The above display example is a display example of a sheet setting status display screen, but the display is not limited to the sheet setting status display screen. In a case where sheet feeding decks are displayed, a display mode may be varied between a reserved sheet feeding deck and an unreserved sheet feeding deck.

It accordingly becomes easier for the user to make various setting operations in accordance with reservation statuses of sheet feeding decks. Especially in a printing condition setting operation to be performed on the printer driver, it becomes possible to make a print setting suitable for a reservation status on the PC 200 without checking a reservation status on the operation display unit 210 of the image forming apparatus 100.

In the above-described first exemplary embodiment, the setting regarding whether to use a sheet feeding deck of which a reservation state is "reserved" is made using the setting button 906 arranged in the tab 902 of the printer driver. In contrast to this, in a third exemplary embodiment, a setting method to be employed in a case where a reserved printing function is used will be described.

The reserved printing function is a function of temporarily holding a print job transmitted from the PC 200, in the storage unit 205 of the image forming apparatus 100 without immediately outputting the print job. Printing is started when a print instruction is issued from the operation display unit 210 of the image forming apparatus 100.

Figure 17:
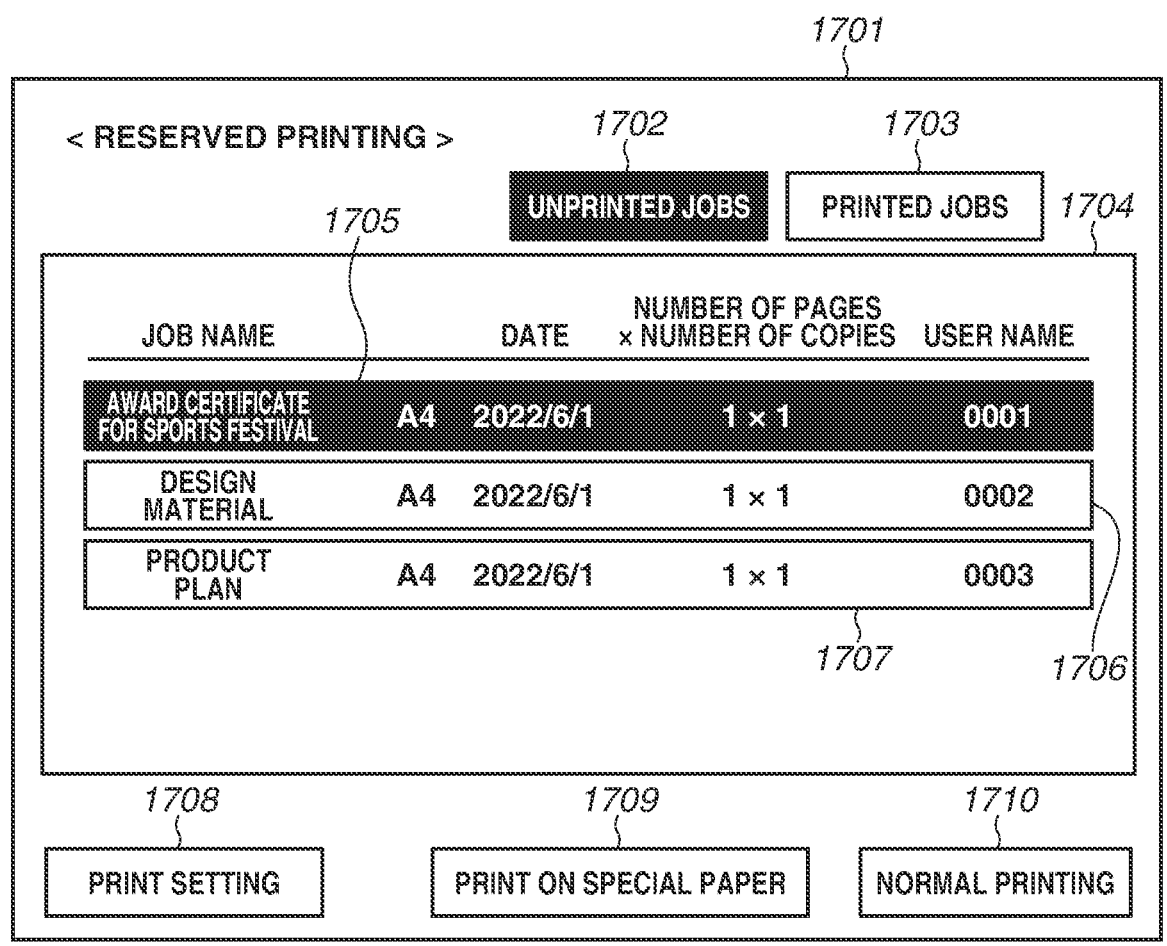
FIG. 17 is a diagram illustrating an example of a screen of a reserved printing function of an image forming apparatus according to a third exemplary embodiment.

FIG. 17 is a diagram illustrating a screen to be displayed in a case where the button 505 has been pressed on the above-described home screen 501 in FIG. 5 that is displayed on the operation display unit 210 of the image forming apparatus 100. A button 1702 for displaying a list of unprinted jobs transmitted from the PC 200, and a button 1703 for displaying a list of already-printed jobs are arranged on a reserved printing screen 1701. FIG. 17 illustrates a state in which the button 1702 is selected. In FIG. 17, three print jobs 1705 to 1707 are listed in a print queue. As illustrated in a region 1704, a job name, a job reception date, the number of pages of one document and the designated number of copies, and a job owner are displayed for each print job. A button 1708 is a button for changing a print setting. The button 1708 is used to change the number of copies or change a color mode, for example.

If the CPU 202 detects that a button 1710 for starting printing has been pressed in a state in which a print job is selected from the above-described print job list, the CPU 202 starts printer processing.

On the other hand, the printer processing is also started upon the press of a button 1709, which serves as a characteristic button in various embodiments of the present disclosure. A point different from the case where the above-described button 1710 is pressed will be described next. In a case where printing is started upon the press of the button 1709 for printing on special paper, a setting similar to the setting made in a case where the "YES" is set to use sheets installed on a reserved sheet feeding deck using the setting button 906 on the printer driver as described in the first exemplary embodiment is made for a print job. With this configuration, in a case where the user desires to print the print job 1705 of "award certificate for sports festival" in the print job list on coated paper, for example, in a state in which the sheet feeding cassette 102 is reserved as in Table 2, the print job 1705 can be printed on coated paper installed on the reserved sheet feeding deck. In a case where printing is started upon the press of the button 1710, a setting similar to the setting made in a case where the "NO" is set to not use sheets installed on a reserved sheet feeding deck using the setting button 906 on the printer driver as described in the first exemplary embodiment is made for a print job, and coated paper installed on a reserved sheet feeding deck cannot be used. Accordingly, by starting the printing of general office documents such as the print job 1706 of "design material" and the print job 1707 of "product plan" in the print job list by pressing the button 1710, it is possible to prevent such documents from being erroneously printed on coated paper.

Heretofore, the method of setting the usage of a reserved sheet feeding deck for a print job in the reserved printing function has been described.

In the first to third exemplary embodiments, by setting a setting status of a sheet feeding deck to "reserved", the reserved sheet feeding deck can be used only in a job for which the usage of the reserved sheet feeding deck is set to "YES", and sheets on the reserved sheet feeding deck can be prevented from being erroneously used in a job for which the usage of the reserved sheet feeding deck is set to "NO". In a fourth exemplary embodiment, when a setting status of a sheet feeding deck is set to "reserved", by prompting the user to successively replace sheets with special sheets desired to be prevented from being erroneously used, and to set the type of the special sheet, it is possible to prevent the user from forgetting to change sheets and from forgetting to designate the type, thereby enabling printing to be surely executed on a sheet desired by the user.

When it is determined that the user has designated the reservation of a sheet feeding deck, the user is instructed to install sheets on which printing is to be actually performed, on the sheet feeding deck of which the reservation has been designated. Furthermore, if it is determined that the user has actually replaced sheets on the reserved sheet feeding deck, the user is instructed to enter the type of the sheet. Because the system configuration according to the present exemplary embodiment is the same as those described in the above-described exemplary embodiments, the description will be omitted, and only a difference from the above-described exemplary embodiments will be described.

Figure 18:
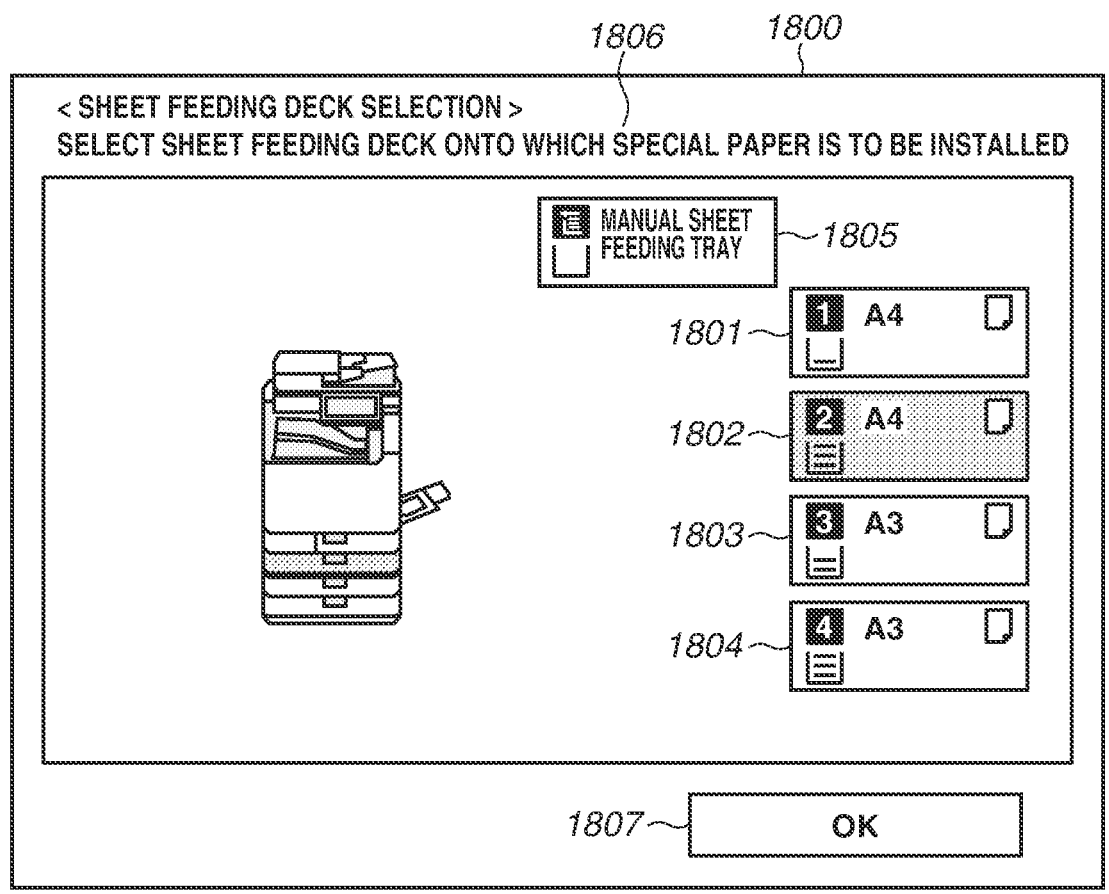
FIG. 18 is a diagram illustrating an example of a reserved sheet feeding deck designation screen of an image forming apparatus according to a fourth exemplary embodiment.

FIG. 18 is a diagram illustrating an example of an instruction screen to be displayed on the operation display unit 210 to prompt the user to designate a sheet feeding deck to be reserved.

The sheet setting screen 601 illustrated in FIG. 6 is used to set a state of a sheet feeding deck to "reserved" after special sheets are preliminarily installed on the sheet feeding deck. Furthermore, the sheet type setting screen 701 illustrated in FIG. 7 is similarly used to designate the type of sheets installed on a sheet feeding deck after special sheets are installed on the sheet feeding deck. Nevertheless, the sheet type setting screen 701 is displayed when the user has explicitly pressed the button 607 on the sheet setting screen 601, and some users might forget to set a sheet type. In contrast to this, the screen illustrated in FIG. 18 is a screen to be displayed when the CPU 202 determines that it is necessary to set the state of any sheet feeding deck to a reserved state, such as the time when a job for which the usage of a reserved sheet feeding deck is set to "YES" is being executed. Alternatively, the screen illustrated in FIG. 18 is displayed when the user has issued an instruction to display a navigation guide for a sheet feeding deck reservation operation.

A screen 1800 is displayed on the operation display unit 210, and prompts the user to designate a sheet feeding deck to be reserved.

Buttons 1801 to 1804 are buttons for designating a sheet feeding cassette to be reserved, and respectively corresponds to the sheet feeding cassettes 1 (102) to 4 (105).

A manual feeding tray button 1805 is a button for designating the manual feeding tray 106 as a sheet feeding deck to be reserved.

A reservation instruction message 1806 is an instruction message for prompting the user to select any sheet feeding deck to be reserved.

If an OK button 1807 is pressed in a state in which any of the buttons 1801 to 1805 is selected, the reservation of a sheet feeding deck corresponding to the selected button is determined. If the OK button 1807 is pressed, and the sheet feeding deck designated by the user is determined as a reserved sheet feeding deck, the CPU 202 closes the screen 1800. Next, the CPU 202 instructs the user to replace sheets on the reserved sheet feeding deck.

Figure 19:
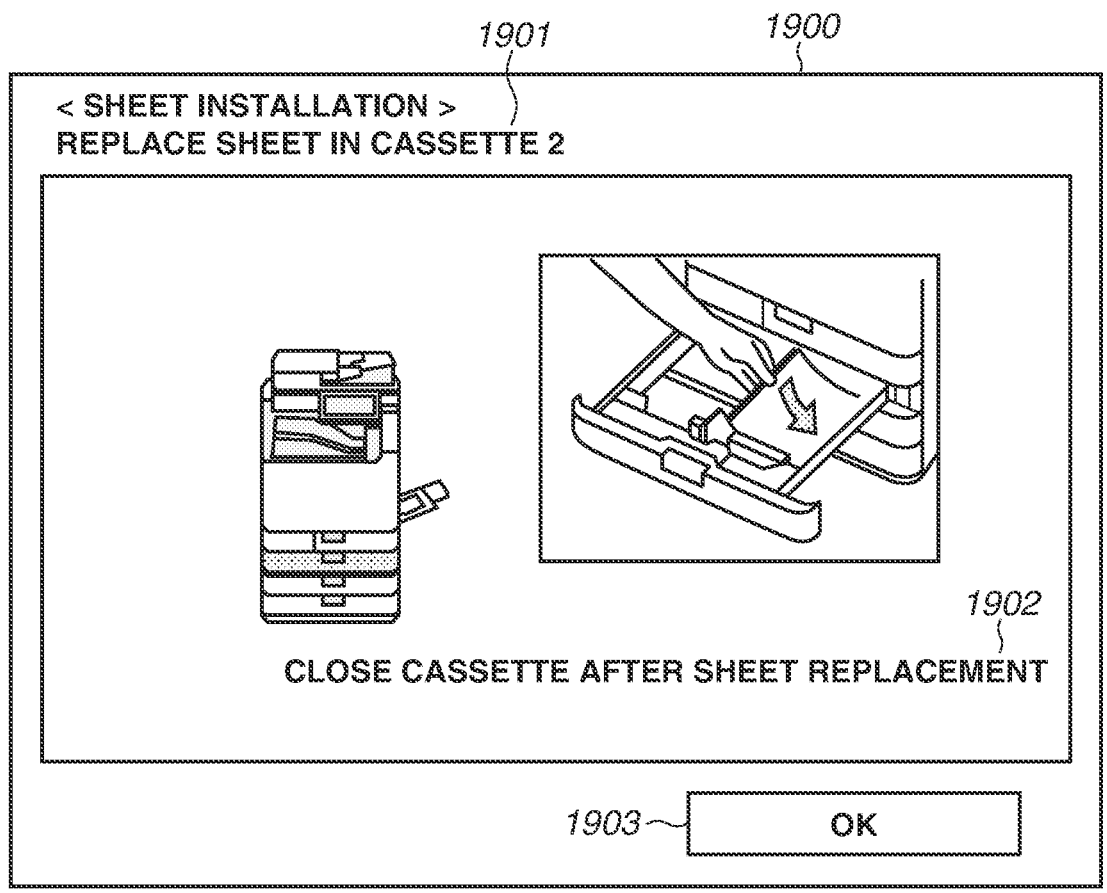
FIG. 19 is a diagram illustrating an example of a sheet replacement instruction screen of the image forming apparatus according to the fourth exemplary embodiment.

FIG. 19 is a diagram illustrating an example of an instruction screen to be displayed on the operation display unit 210 to prompt the user to replace sheets on a sheet feeding deck. The instruction screen is displayed to instruct the user to replace sheets on a reserved sheet feeding deck, after the reserved sheet feeding deck is determined by the press of the OK button 1807 on the screen 1800 illustrated in FIG. 18.

A screen 1900 is similarly displayed on the operation display unit 210, and instructs the user to replace sheets on a sheet feeding deck. FIG. 19 illustrates an example in which the button 1802 is selected on the screen 1800, and the user is instructed to replace sheets on the sheet feeding cassette 2 (103).

A sheet replacement instruction message 1901 is an instruction message for prompting the user to replace sheets on the sheet feeding cassette 2 (103). In a case where the reserved sheet feeding deck is a sheet feeding cassette, a sheet feeding cassette close instruction message 1902 is displayed on the screen 1900 to prompt the user to close the sheet feeding cassette after sheet replacement. An OK button 1903 is a button for instructing sheet replacement completion upon being pressed by the user.

When the screen 1900 is displayed, sheet replacement completion can be detected using the open/close detection sensors 1 and 2 (304 and 305) and the tray sheet presence/absence detection sensor 303 installed on the sheet feeding cassettes 102 to 105 and the manual feeding tray 106. Nevertheless, in a case where there is no need to replace sheets, or in a case where sheet replacement completion has failed to be properly detected due to a sheet replacement timing or sensor accuracy, sheet replacement completion is detected upon the press of the OK button 1903. In a case where sheet replacement completion is detected when the screen 1900 is displayed, the CPU 202 closes the screen 1900. Next, the CPU 202 instructs the user to enter the sheet type of installed sheets after replacement.

FIG. 20 is a diagram illustrating an example of a designation screen to be displayed on the operation display unit 210 to prompt the user to enter a sheet type. The designation screen is displayed to prompt the user to enter the sheet type of the installed sheets, after sheet replacement completion of the reserved sheet feeding deck is detected when the screen 1900 illustrated in FIG. 19 is displayed. A screen 2000 is similarly displayed on the operation display unit 210, and prompts the user to enter the sheet type.

A sheet type input instruction message 2001 is an instruction message for prompting the user to select a button of any sheet type corresponding to the installed sheets.

Various sheet types are described on sheet type buttons 2002. By prompting the user to select any button, the sheet type of the installed sheets is designated.

An advanced setting screen display button 2003 is a button for displaying an advance setting screen for setting a sheet type in more detail. The description of the advance setting screen will be omitted.

An OK button 2004 is a button for determining the sheet type designated by the selection of any of the sheet type buttons 2002. Upon the press of the OK button 2004, the CPU 202 sets the sheet type corresponding to the currently-selected button 2002, as the sheet type of the installed sheets, and closes the screen 2000.

In this manner, if it is determined that it is necessary to reserve a sheet feeding deck, the screens 1800 to 2000 are displayed consecutively to give instructions to the user, whereby it is possible to prevent the user from forgetting to replace sheets on the reserved sheet feeding deck, and from forgetting to set the sheet type.

Figure 21:
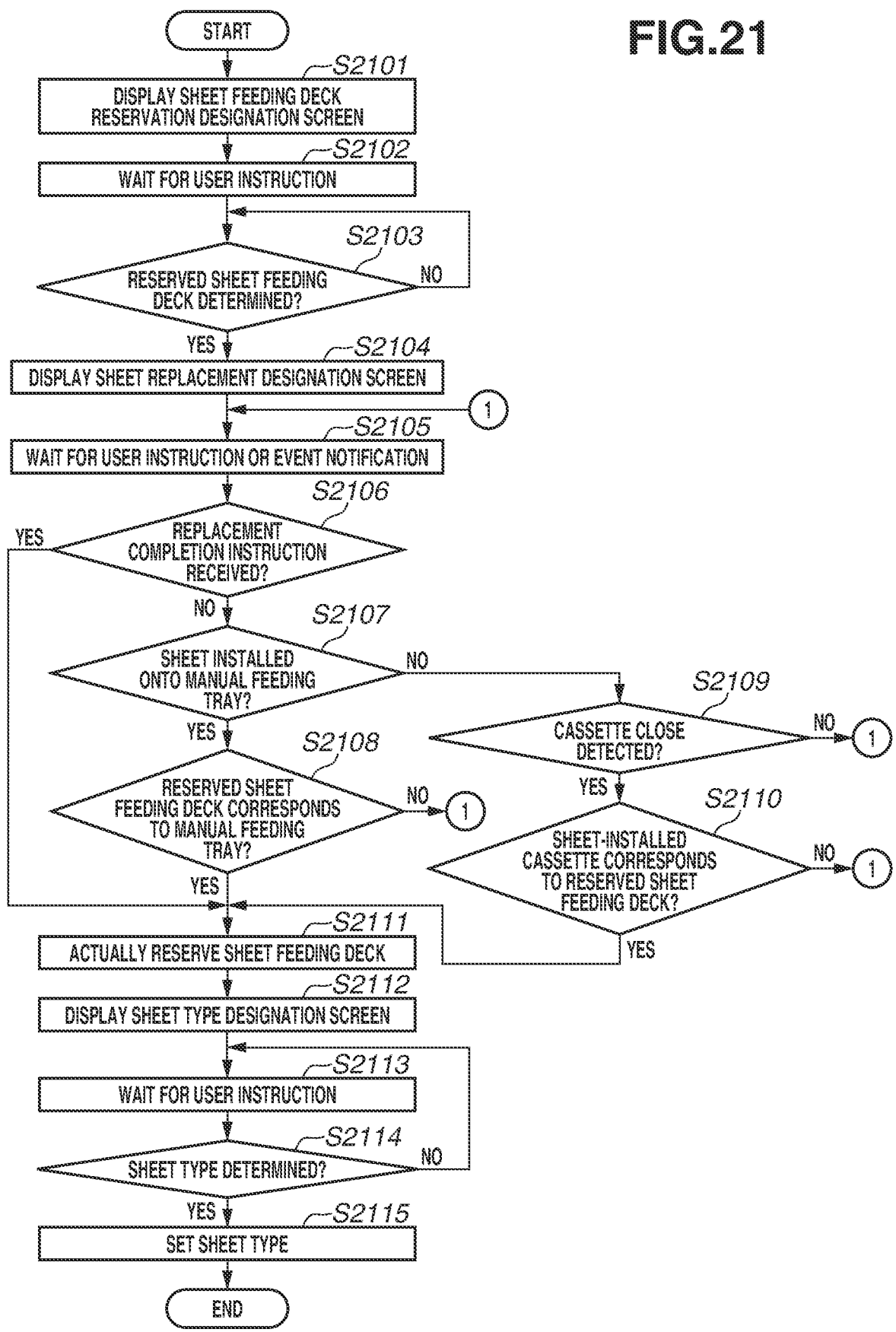
FIG. 21 is a flowchart illustrating a series of processes from reserved sheet feeding deck designation according to the fourth exemplary embodiment.

FIG. 21 is a flowchart illustrating a series of processes from a process of designating a sheet feeding deck to be reserved according to the present exemplary embodiment. The description will be given of processing of prompting the user to designate a sheet feeding deck to be reserved after the CPU 202 has determined that it is necessary to reserve any sheet feeding deck.

First of all, in step S2101, the CPU 202 determines that an instruction to reserve a sheet feeding deck has been issued, and displays a screen for designating a sheet feeding deck to be reserved, on the operation display unit 210. Specifically, the screen 1800 illustrated in FIG. 18 is displayed.

Next, in step S2102, the CPU 202 waits for an instruction to be issued by the user via the operation display unit 210.

Furthermore, in step S2103, the CPU 202 determines whether a reserved sheet feeding deck has been determined by an instruction issued by the user. In other words, the CPU 202 determines whether the OK button 1807 has been pressed in a state in which any of the buttons 1801 to 1805 is selected on the screen 1800. In a case where it is determined that a reserved sheet feeding deck has not been determined (NO in step S2103), the processing of step S2102 is repeated.

In a case where it is determined in step S2103 that a reserved sheet feeding deck has been determined (YES in step S2103), the processing proceeds to step S2104. In step S2104, the CPU 202 displays the screen 1900 illustrated in FIG. 19, on the operation display unit 210. The screen 1900 may be a screen for prompting the user to replace sheets, or may be a screen for confirming whether sheets have been replaced.

Next, in step S2105, the CPU 202 waits for a user instruction to be issued via the operation display unit 210, or an event notification to be issued from a sensor on each sheet feeding deck.

Furthermore, in step S2106, the CPU 202 determines whether sheet replacement completion has been detected based on an instruction input by the user. Specifically, the CPU 202 determines whether the OK button 1903 on the screen 1900 has been pressed. In a case where it is determined that the OK button 1903 has been pressed, and the user has instructed a sheet replacement completion (YES in step S2106), the processing proceeds to step S2111.

In a case where it is determined in step S2106 that sheet replacement completion has not been detected based on an instruction issued by the user (NO in step S2106), the processing proceeds to step S2107. In step S2107, the CPU 202 determines whether a sheet has been placed on the manual feeding tray 106. In this step, the CPU 202 determines whether a state of the manual feeding tray 106 has transitioned from a sheet absent state to a sheet present state, based on an event notification from the tray sheet presence/absence detection sensor 303. In a case where it is determined that no sheet is placed on the manual feeding tray 106 (NO in step S2107), the processing proceeds to step S2109.

In a case where it is determined in step S2107 that a sheet has been placed on the manual feeding tray 106 (YES in step S2107), the processing proceeds to step S2108. In step S2108, the CPU 202 determines whether the reserved sheet feeding deck determined in step S2103 is the manual feeding tray 106. In a case where it is determined that the reserved sheet feeding deck is the manual feeding tray 106 (YES in step S2108), it is determined that a sheet has been properly placed on the manual feeding tray 106 serving as the reserved sheet feeding deck, and the processing proceeds to step S2111.

In a case where it is determined in step S2108 that the reserved sheet feeding deck is not the manual feeding tray 106 (NO in step S2108), the processing returns to step S2105.

In a case where it is determined in step S2107 that no sheet is placed on the manual feeding tray 106 (NO in step S2107), the processing proceeds to step S2109. In step S2109, the CPU 202 determines whether a sheet has been installed on any sheet feeding cassette. In this step, the CPU 202 determines whether any sheet feeding cassette has been closed, based on an event notification from the open/close detection sensor 1 or 2 (304 or 305) on each sheet feeding cassette. In addition, in consideration of an event notification from the tray sheet presence/absence detection sensor 303 on each sheet feeding cassette, it may be determined whether a sheet feeding cassette has been closed and a sheet is set in the sheet feeding cassette. In a case where it is determined that none of the sheet feeding cassettes have been closed (NO in step S2109), the processing returns to step S2105.

In a case where it is determined in step S2109 that a sheet has been installed on any sheet feeding cassette (YES in step S2109), the processing proceeds to step S2110. In step S2110, the CPU 202 determines whether the sheet feeding cassette on which a sheet has been determined to be installed, and the reserved sheet feeding deck determined in step S2103 are identical. In a case where it is determined that the sheet feeding cassette on which a sheet has been installed, and the reserved sheet feeding deck are not identical (NO in step S2110), the processing returns to step S2105.

In a case where it is determined in step S2110 that the sheet feeding cassette on which a sheet has been installed, and the determined reserved sheet feeding deck are identical (YES in step S2110), the processing proceeds to step S2111. In step S2111, the CPU 202 performs actual reservation processing of the determined reserved sheet feeding deck. Also in a case where sheet replacement completion has been detected based on an instruction issued by the user (YES in step S2106), or in a case where it is determined that the determined reserved sheet feeding deck is the manual feeding tray 106 (YES in step S2108), the processing proceeds to step S2111, in which the CPU 202 similarly performs actual reservation processing of the determined reserved sheet feeding deck.

In this step, specifically, in the sheet feeding deck information indicated in Table 1, the CPU 202 changes the reservation state (3005) of the determined reserved sheet feeding deck to a reserved state.

Next, in step S2112, the CPU 202 displays a sheet type designation screen on the operation display unit 210. Specifically, the screen 2000 illustrated in FIG. 20 is displayed.

Furthermore, in step S2113, the CPU 202 waits for a user instruction to be issued via the operation display unit 210.

After that, in step S2114, the CPU 202 determines whether a sheet type has been designated based on an instruction issued by the user. In other words, the CPU 202 determines whether the OK button 2004 has been pressed in a state in which any of the sheet type buttons 2002 has been selected on the screen 2000. In a case where it is determined that a sheet type has not been designated (NO in step S2114), the processing returns to step S2113.

In a case where it is determined in step S2114 that a sheet type has been designated (YES in step S2114), the processing proceeds to step S2115. In step S2115, the CPU 202 sets the sheet type for the sheet feeding deck of which the reservation processing has been performed in step S2111. In this step, specifically, in the sheet feeding deck information as indicated in Table 1, the CPU 202 rewrites the sheet type (3003) of the sheet feeding deck of which the reservation processing has been performed, to the determined sheet type. Then, the series of processes is ended.

In this manner, after the CPU 202 determines that it is necessary to reserve a sheet feeding deck, the CPU 202 can prompt the user to execute, as the series of processes, the process of designating a sheet feeding deck to be reserved, the process of replacing sheets on the sheet feeding deck, and furthermore, the process of setting the type of the installed sheets. With this configuration, it is possible to prevent the user from forgetting to replace sheets on the reserved sheet feeding deck and from forgetting to set the sheet type, and prevent erroneous printing on undesired sheets, and an error such as sheet distortion or paper jam that is attributed to a sheet type setting mistake.

In a fifth exemplary embodiment, a reservation cancel method will be described. Because the system configuration according to the present exemplary embodiment is the same as those described in the above-described exemplary embodiments, the description will be omitted, and only a reservation cancel method of a sheet feeding deck, which is a point different from the above-described exemplary embodiments, will be described.

Figure 22:
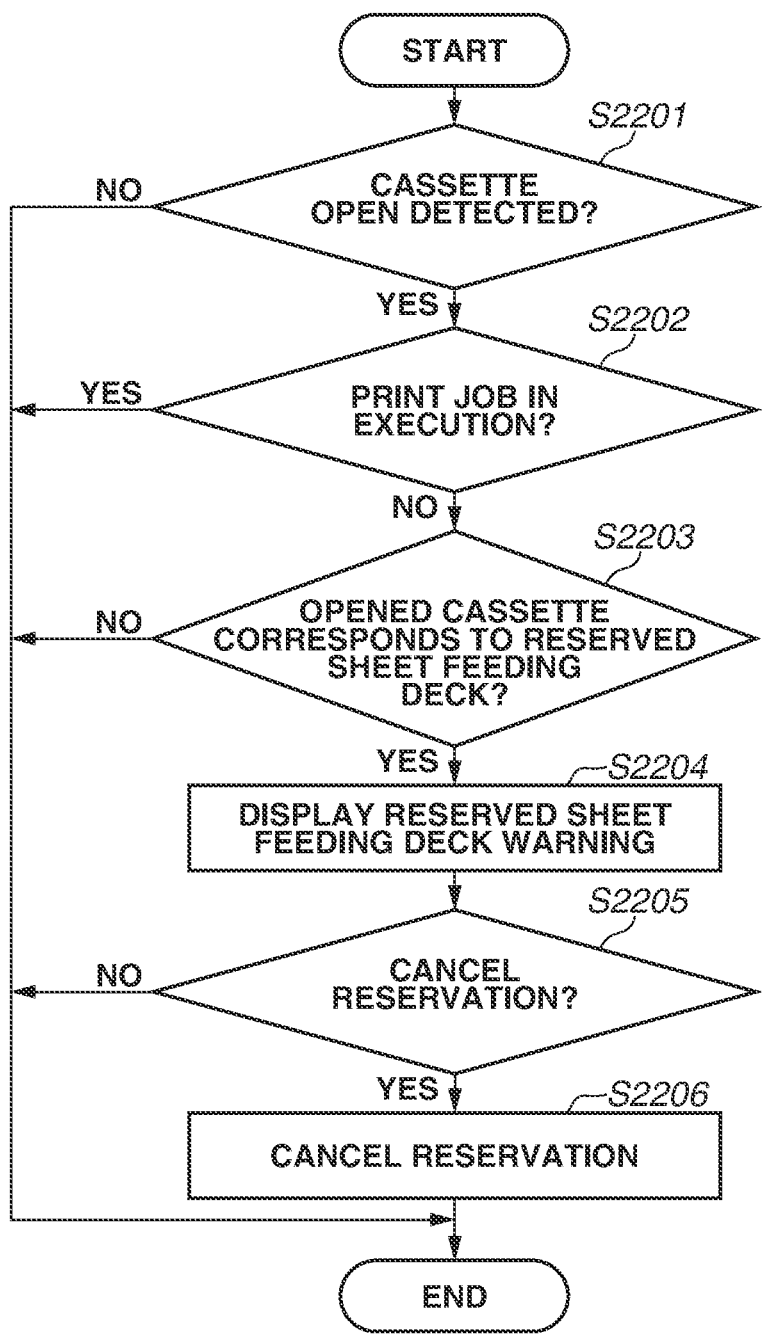
FIG. 22 is a flowchart illustrating sheet feeding deck reservation cancel processing to be executed in response to open detection of a sheet feeding cassette according to a fifth exemplary embodiment.

FIG. 22 is a flowchart illustrating a flow of cancelling a reservation in response to open detection of the sheet feeding cassette 1 or 2 (102 or 103). In step S2201, the CPU 202 determines whether the open/close detection sensor 1 or 2 (304 or 305) of the sheet feeding cassette 1 or 2 (102 or 103) has detected a change from the closed state to the opened state. In a case where a change from the closed state to the opened state has been detected (YES in step S2201), the processing proceeds to step S2202. In step S2202, the CPU 202 determines whether the image forming apparatus 100 is executing a print job.

Figure 8:
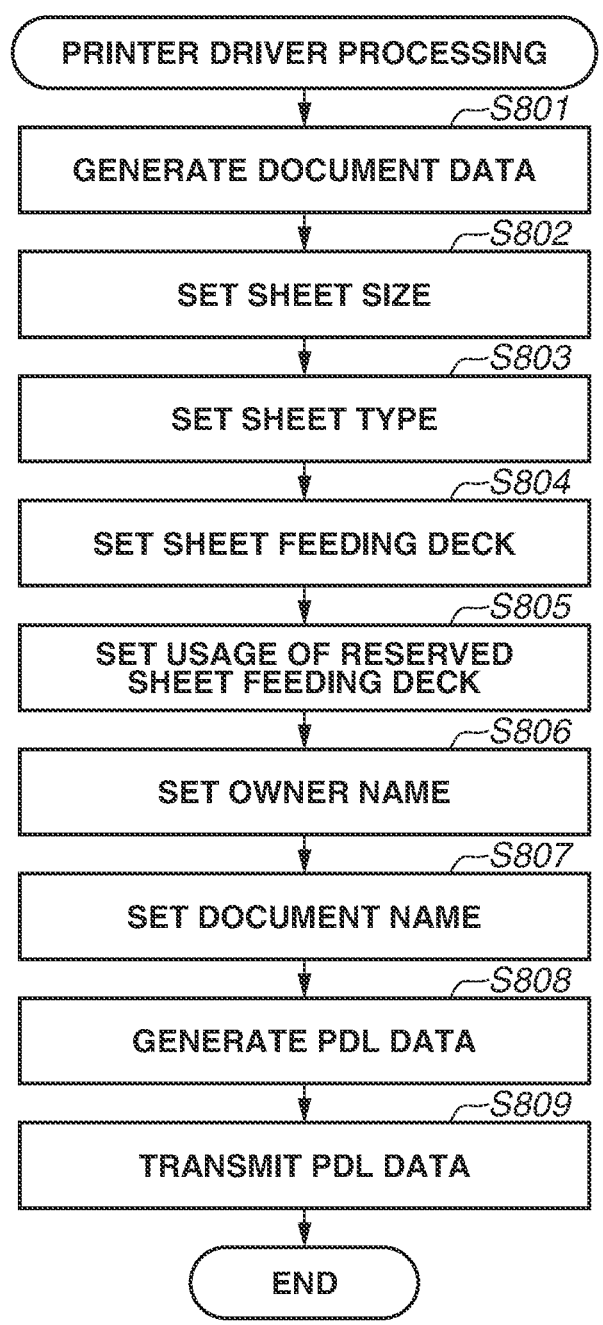
FIG. 8 is a flowchart illustrating printer driver processing to generate a print job according to the first exemplary embodiment.

In this step, if there is a print job on which the print processing in the flowchart illustrated in FIG. 8 is being executed, the CPU 202 determines that a print job is in execution, and if there is no print job on which the print processing in the flowchart illustrated in FIG. 8 is being executed, the CPU 202 determines that a print job is not in execution. The determination in step S2202 may be skipped, and in a case where the open of a sheet feeding cassette has been detected in step S2201 (YES in step S2201), the processing may proceed to step S2203.

In a case where it is determined in step S2202 that a print job is not in execution (NO in step S2202), the processing proceeds to step S2203. In step S2203, the CPU 202 determines whether the sheet feeding cassette 1 or 2 (102 or 103) of which a state change from the closed state to the opened state has been detected is a sheet feeding deck in a reserved state.

For example, a reservation state of each sheet feeding deck is held in the storage unit 205 of the image forming apparatus 100 as sheet feeding deck information as indicated in Table 3 provided below. The data structure and the meaning of rows and columns in Table 3 are similar to those in Table 1.

TABLE 3

Setting Status of Each Sheet Feeding Deck

| Sheet feeding deck (3001) | Sheet size (3002) | Sheet type (3003) | Sheet remaining amount (3004) | Reservation state (3005) |
| --- | --- | --- | --- | --- |
| Sheet feeding cassette 1 | A4 | Plain paper 1 | 25% | — |
| Sheet feeding cassette 2 | A4 | Coated paper | 25% | Reserved |
| Sheet feeding cassette 3 | A3 | Plain paper 1 | 50% | — |
| Sheet feeding cassette 4 | A3 | Plain paper 1 | 100% | — |
| Manual feeding tray | B5 | Coated paper | 0% | Reserved |

In Table 3, because the reservation state (3005) of the "sheet feeding cassette 2" in the sheet feeding deck (3001) is "reserved", it can be understood that the sheet feeding cassette 2 (103) is in a reserved state. In a case where the sheet feeding cassette 1 or 2 (102 or 103) is a sheet feeding deck in the reserved state (YES in step S2203), the processing proceeds to step S2204. In step S2204, the CPU 202 displays a warning for notifying the user that the opened sheet feeding cassette is a reserved sheet feeding deck.

Figure 23:
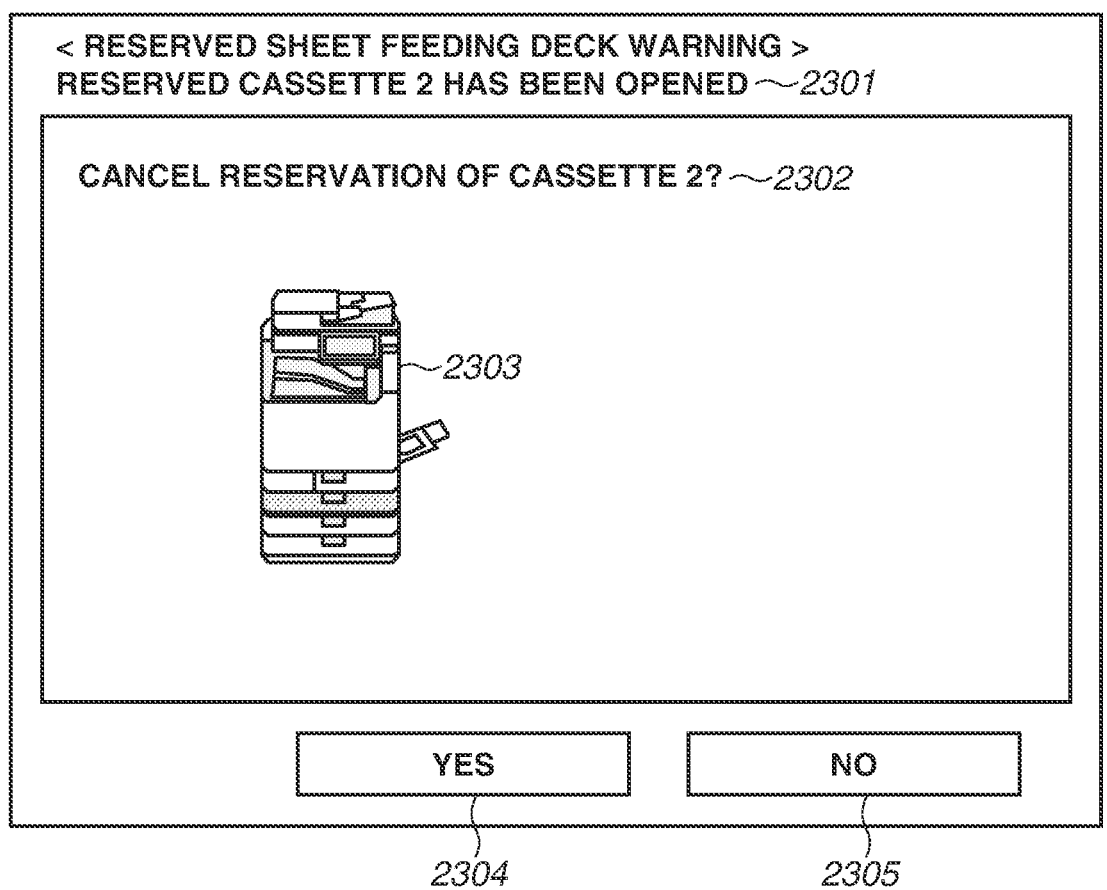
FIG. 23 is a diagram illustrating a display example of a reserved sheet feeding deck warning to be displayed in response to open detection of a sheet feeding cassette according to the fifth exemplary embodiment.

FIG. 23 is a diagram illustrating an example of the warning display. A message 2301 is a message for warning the user of a reserved sheet feeding deck being opened. More specifically, the message 2301 is displayed to notify the user that a sheet feeding cassette in the reserved state has been opened. In this example, the message 2301 indicates that the open/close detection sensor (305) of the reserved sheet feeding cassette 2 (103) has detected the open state.

A message 2302 is a message for sheet feeding deck reservation cancel confirmation, and is displayed to ask the user to confirm whether to cancel the reservation of the sheet feeding cassette. In this example, the message 2302 asks the user whether to cancel the reservation of the sheet feeding cassette 2 (103).

An image 2303 is an image for presenting a location of the opened sheet feeding deck to the user. In this example, because the opened reserved sheet feeding deck is assumed to be the sheet feeding cassette 2 (103), a portion corresponding to the sheet feeding cassette 2 (103) is highlighted in a dark color. A button 2304 is a reservation cancellation confirmation button, and is a button for receiving confirmation of a reservation cancellation made by the user. A button 2305 is a reservation cancellation cancellation button, and is a button for receiving cancellation of a reservation cancellation made by the user.

In step S2205, the CPU 202 determines whether reservation cancellation has been confirmed. In a case where the press of the button 2304 has been received from the user on the screen illustrated in FIG. 23, the CPU 202 determines that a reservation cancel processing has been performed. In a case where it is determined that a reservation cancel instruction has been issued (YES in step S2205), the processing proceeds to step S2206. In step S2206, the CPU 202 cancels the reservation.

If the reservation of the sheet feeding cassette 2 (103) in the reserved state is cancelled in step S2206, the reservation state (3005) of the "sheet feeding cassette 2" in Table 3 is changed from "reserved" to "–" indicating an unreserved state.

In a case where the press of the button 2305 has been received, the CPU 202 determines in step S2205 that reservation cancellation has not been confirmed (NO in step S2205), and the processing is ended without cancelling the reservation.

By performing the reservation cancel processing in the flowchart illustrated in FIG. 22, it is possible to prevent sheets on a sheet feeding cassette from being erroneously replaced by the user who is unaware of a reserved state. In addition, because the reservation of a sheet feeding cassette is cancelled in response to the open detection of the sheet feeding cassette, the user can be aware that sheets on the sheet feeding cassette that the user has reserved has been replaced by another user.

Figure 24:
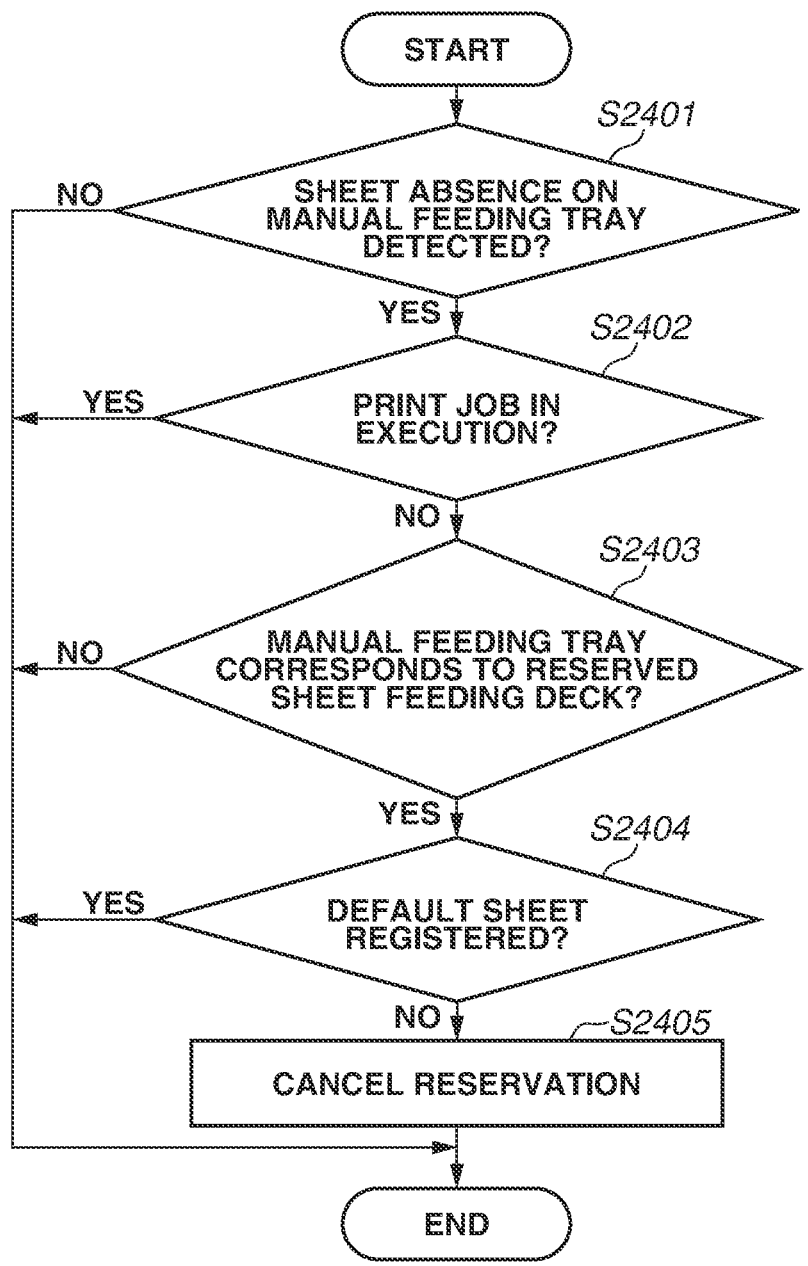
FIG. 24 is a flowchart illustrating sheet feeding deck reservation cancel processing to be executed in response to sheet absence detection on a manual feeding tray according to the fifth exemplary embodiment.

FIG. 24 is a flowchart illustrating a flow of cancelling reservation in response to sheet presence/absence detection in the manual feeding tray 106.

In step S2401, the CPU 202 determines whether the tray sheet presence/absence detection sensor 303 of the manual feeding tray 106 has detected a change from the sheet present state to the sheet absent state. In a case where a change from the sheet present state to the sheet absent state has been detected (YES in step S2401), the processing proceeds to step S2402. In step S2402, the CPU 202 determines whether the image forming apparatus 100 is executing a print job. The method of determining whether a print job is in execution is the same as that in the flowchart illustrated in FIG. 22. In a case where it is determined in step S2402 that a print job is not in execution (NO in step S2402), the processing proceeds to step S2403. In step S2403, the CPU 202 determines whether the manual feeding tray 106 is a reserved sheet feeding deck. The method of determining whether the manual feeding tray 106 is a reserved sheet feeding deck is the similar to that in step S2203. For example, in the case of Table 4 provided below, because the reservation state (3005) of the "manual feeding tray 106" in the sheet feeding deck (3001) is "reserved", it can be understood that the manual feeding tray 106 is reserved.

TABLE 4

Setting Status of Each Sheet Feeding Deck

| Sheet feeding deck (3001) | Sheet size (3002) | Sheet type (3003) | Sheet remaining amount (3004) | Reservation state (3005) |
|---|---|---|---|---|
| Sheet feeding cassette 102 | A4 | Plain paper 1 | 25% | — |
| Sheet feeding cassette 103 | A4 | Coated paper | 25% | — |
| Sheet feeding cassette 104 | A3 | Plain paper 1 | 50% | — |
| Sheet feeding cassette 105 | A3 | Plain paper 1 | 100% | — |
| Manual feeding tray 106 | Unset | Unset | 0% | Reserved |

In a case where the manual feeding tray 106 is a reserved sheet feeding deck (YES in step S2403), the processing proceeds to step S2404. In step S2404, the CPU 202 checks whether a default sheet is registered as a sheet to be used on the manual feeding tray 106.

In the image forming apparatus 100, the user can register a size and a type of a default sheet to be used on the manual feeding tray 106 in advance. In a case where a default sheet is not registered, each time a sheet is placed on the manual feeding tray 106, the user is requested to set the size and the type of the placed sheet. In a case where it is determined in step S2404 that a default sheet of the manual feeding tray 106 is not registered (NO in step S2404), the processing proceeds to step S2405. In step S2405, the CPU 202 cancels the reservation of the manual feeding tray 106. For example, in the case of Table 4, because the sheet size (3002) and the sheet type (3003) of the manual feeding tray 106 are "unset", it is determined in step S2404 that a default sheet is not registered, and in step S2405, the reservation of the manual feeding tray 106 is cancelled. If the reservation of the manual feeding tray 106 in the reserved state is cancelled in step S2405, the reservation state (3005) of the "manual feeding tray 106" in Table 4 is changed from "reserved" to "–" indicating the unreserved state.

In a case where it is determined in step S2404 that a default sheet is registered (YES in step S2404), the processing is ended without cancelling the reservation.

For example, if the status of the "manual feeding tray 106" is as indicated in Table 3, because the sheet size (3002) is "B5" and the sheet type (3003) is "coated paper", neither of which is "unset", it is determined in step S2404 that a default sheet is registered (YES in step S2404), and the reservation state remains unchanged from the "reserved" state.

By performing the reservation cancel processing in the flowchart illustrated in FIG. 23, it is possible to prevent the manual feeding tray from remaining in the reserved state, and becoming unavailable to other users. In addition, a user who always uses a certain type of a special sheet using the manual feeding tray 106 can prevent the special sheet from being erroneously used by another user, because the reservation is not cancelled. In the exemplary embodiment illustrated in FIG. 23, the manual feeding tray 106 has been described, but the exemplary embodiment may be applied to a sheet feeding deck other than the manual feeding tray 106 as long as the sheet feeding deck is provided with a sensor that can detect presence or absence of a sheet.

Figure 25:
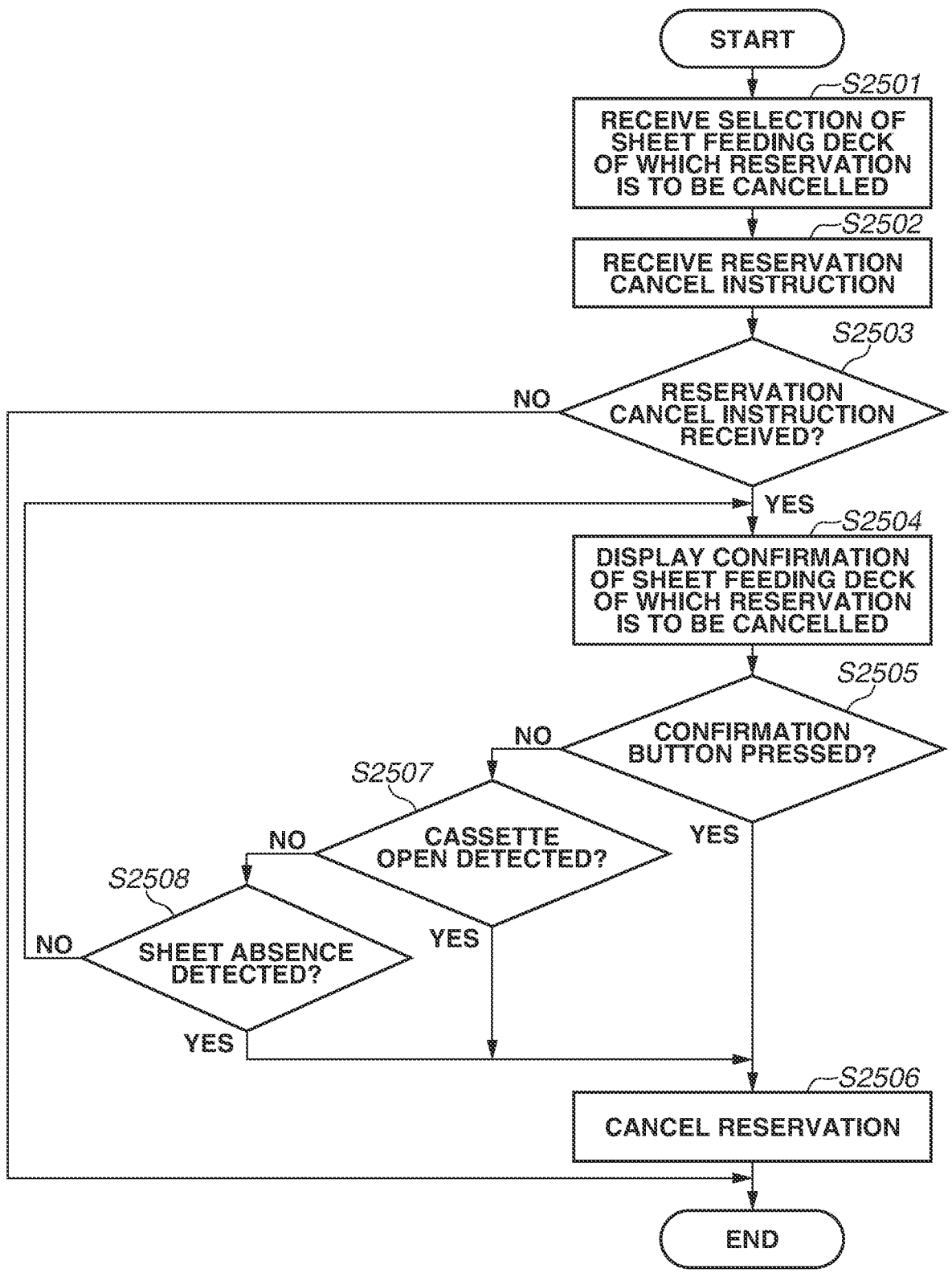
FIG. 25 is a flowchart illustrating sheet feeding deck reservation cancel processing according to the fifth exemplary embodiment.

FIG. 25 is a flowchart illustrating a flow of setting a sheet and cancelling the reservation of a sheet feeding deck. In step S2501, the CPU 202 receives the selection of a sheet feeding deck of which the reservation is to be cancelled. In this example, the CPU 202 prompts the user to select a sheet feeding deck of which the reservation the user desires to cancel, using any of the sheet feeding deck selection buttons (602, 603, 604, 605, 606) as illustrated in FIG. 6. In step S2502, the CPU 202 receives a reservation cancel instruction. In this example, the CPU 202 receives a reservation cancel instruction issued by the user using the reservation button (610) in FIG. 11. In step S2503, the CPU 202 determines whether a reservation cancel instruction has been received. In a case where it is determined in step S2503 that a reservation cancel instruction has been received (YES in step S2503), the processing proceeds to step S2504. In step S2504, the CPU 202 displays confirmation of a sheet feeding deck of which the reservation is to be cancelled. In a case where it is determined in step S2503 that a reservation cancel instruction has not been received (NO in step S2503), the processing is ended.

Figure 26:
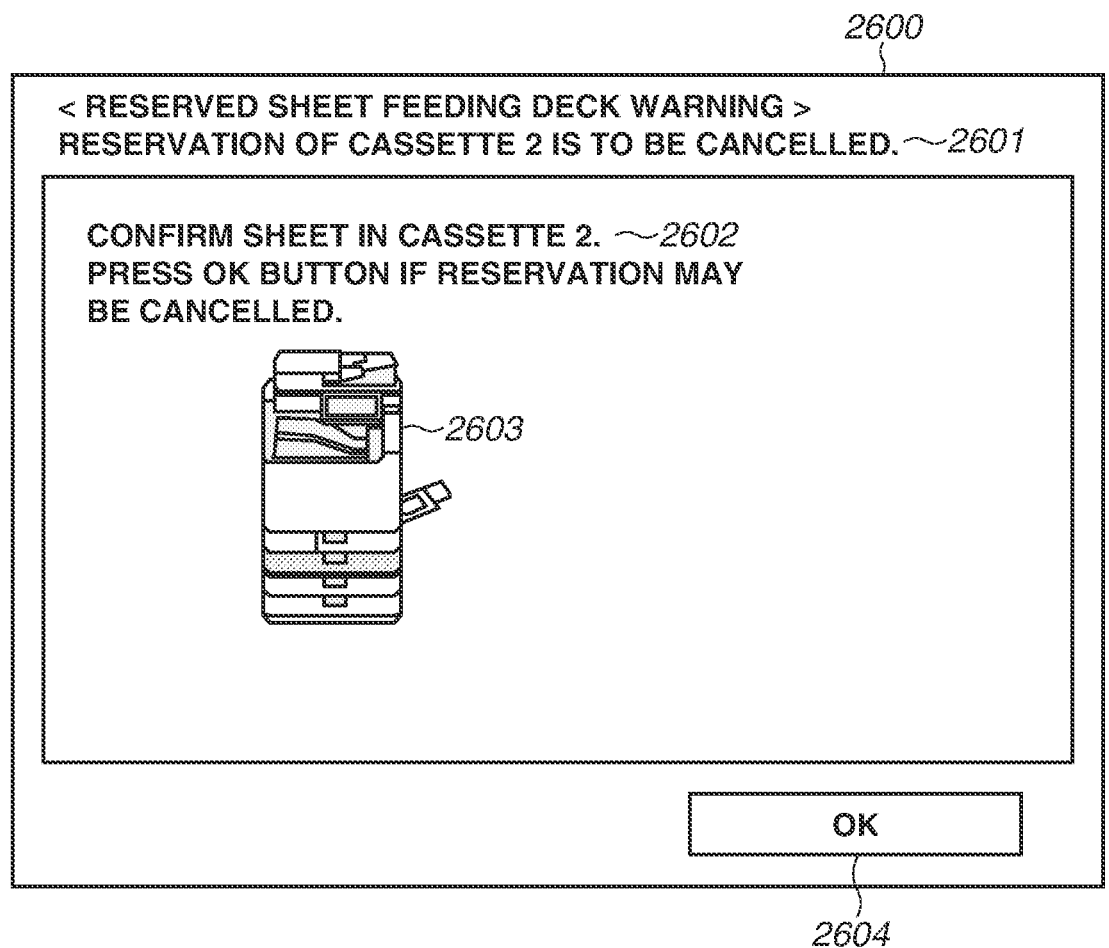
FIG. 26 is a diagram illustrating a display example of sheet feeding deck reservation cancel confirmation according to the fifth exemplary embodiment.

FIG. 26 is a diagram illustrating an example of display for confirming a sheet feeding deck of which the reservation is to be cancelled. A message 2601 in a screen 2006 is a reservation cancellation confirmation message, and is displayed to notify the user that the reservation of a sheet feeding cassette is to be cancelled. In this example, the message 2601 indicates that the reservation of the sheet feeding cassette 2 (103) is to be cancelled. A message 2602 is a sheet feeding deck sheet confirmation message, and is displayed to ask the user to confirm sheets installed on a sheet feeding deck of which the reservation is to be cancelled.

In this example, the message 2602 asks the user whether to cancel the reservation of the sheet feeding cassette 2 (103). An image 2603 is an image for presenting a location of a sheet feeding deck of which the reservation is to be cancelled, to the user. In this example, because a sheet feeding deck of which the reservation is to be cancelled is assumed to be the sheet feeding cassette 2 (103), a portion corresponding to the sheet feeding cassette 2 (103) is highlighted in a dark color. A button 2604 is a reservation cancellation confirmation button, and is a button for receiving a reservation cancellation confirmation made by the user. In step S2505, the CPU 202 checks whether the button 2604 has been pressed. In a case where the reservation cancellation confirmation button 2604 has been pressed (YES in step S2505), the processing proceeds to step S2506. In step S2506, the CPU 202 cancels the reservation. The reservation cancel processing is similar to the reservation cancel processing illustrated in FIGS. 22 and 24. In a case where the reservation cancellation confirmation button 2604 has not been pressed (NO in step S2505), the processing proceeds to step S2507. In step S2507, the CPU 202 determines whether the open of the sheet feeding cassette 1 or 2 (102 or 103) for which a reservation cancel instruction has been received has been detected. In a case where the open of a reservation cancel target cassette has been detected (YES in step S2507), the processing proceeds to step S2506. In step S2506, the CPU 202 cancels the reservation.

In this example, in response to the open detection of the cassette, it is determined that the user has performed sheet confirmation or sheet replacement, and reservation is cancelled.

In a case where it is determined in step S2507 that the open of the cassette has not been detected (NO in step S2507), the processing proceeds to step S2508. In step S2508, the CPU 202 determines whether absence of a sheet in the sheet feeding cassette for which a reservation cancel instruction has been received has been detected. In a case where it is determined in step S2508 that absence of a sheet has been detected (YES in step S2508), the processing proceeds to step S2506. In step S2506, the CPU 202 cancels the reservation. In this example, in response to the detection of the absence of a sheet, it is determined that sheets have been removed by the user, and reservation is cancelled.

In a case where it is determined in step S2508 that sheet absence has not been detected (NO in step S2508), the processing returns to step S2504. In step S2504, the CPU 202 waits for the confirmation button to be pressed by the user.

By performing the reservation cancel processing in the flowchart illustrated in FIG. 25, it is possible to safely cancel reservation while preventing the user from forgetting to place special sheet on a sheet feeding cassette of which the reservation is to be cancelled.

Figure 27:
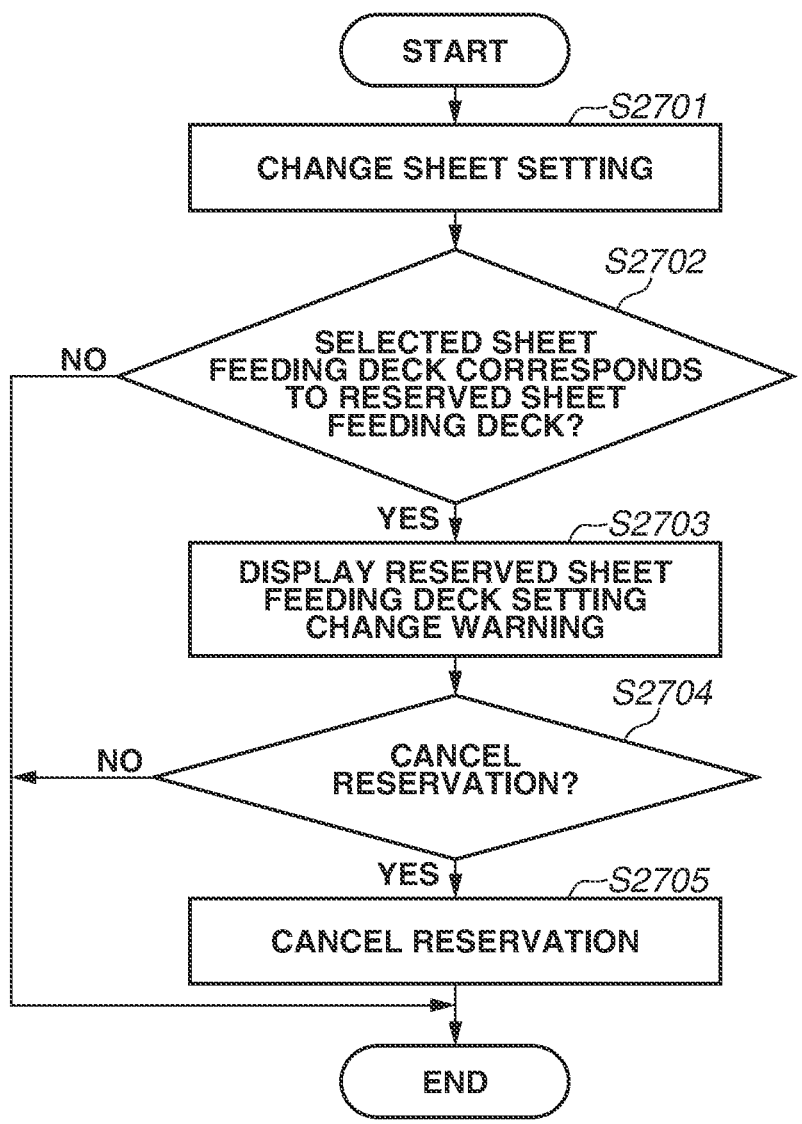
FIG. 27 is a flowchart illustrating sheet feeding deck reservation cancel processing to be executed in response to a sheet setting change according to the fifth exemplary embodiment.

FIG. 27 is a flowchart illustrating a flow of cancelling reservation in response to the detection of a sheet setting change. In step S2701, the CPU 202 receives a sheet setting change. Specifically, the CPU 202 receives a sheet setting change made by the user on the sheet type setting screen 701 illustrated in FIG. 7 that is displayed by the press of the button 607 illustrated in FIG. 6. In step S2702, the CPU 202 checks whether a sheet feeding deck of which a sheet setting has been changed is a reserved sheet feeding deck. In a case where the sheet feeding deck is a reserved sheet feeding deck (YES in step S2702), the processing proceeds to step S2703. In step S2703, the CPU 202 displays a reserved sheet feeding deck setting change warning. Information indicating whether the sheet feeding deck is a reserved sheet feeding deck is managed in the reservation state (3005) in Table 3 or 4.

Figure 28:
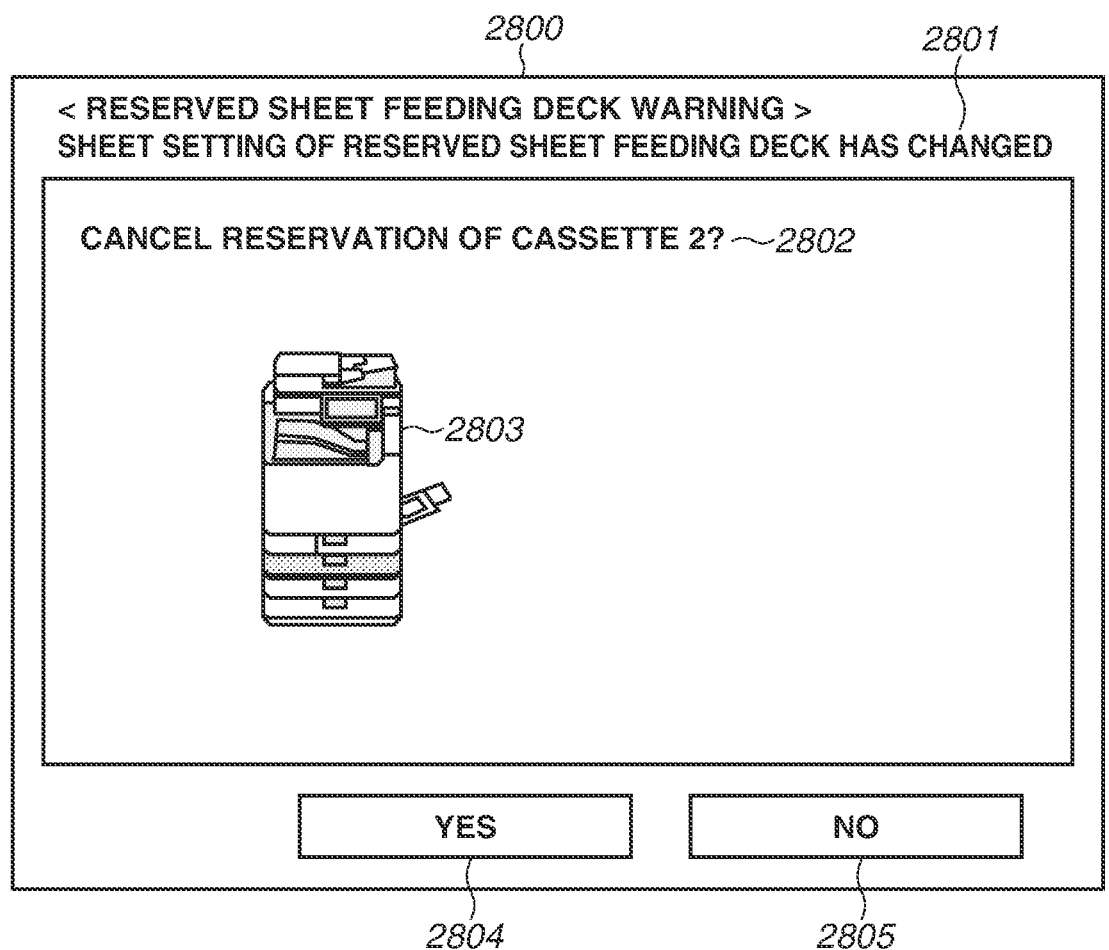
FIG. 28 is a diagram illustrating a display example of a reserved sheet feeding deck setting change warning to be displayed in response to a sheet setting change according to the fifth exemplary embodiment.

FIG. 28 is a diagram illustrating an example of a warning screen. A message 2801 in a screen 2800 is a reserved sheet feeding deck sheet setting change message, and is displayed to notify the user that the sheet setting of a sheet feeding cassette in the reserved state is to be changed. In this example, the message 2801 indicates that the sheet setting of the reserved sheet feeding cassette 2 (103) has been changed. A message 2802 is a sheet feeding deck reservation cancellation confirmation message, and is displayed to ask the user to confirm whether to cancel the reservation of the sheet feeding cassette. In this example, the message 2802 asks the user whether to cancel the reservation of the sheet feeding cassette 2 (103). An image 2803 is an image for presenting a location of a reserved sheet feeding deck of which the sheet setting has been changed, to the user. In this example, because the reserved sheet feeding deck of which the sheet setting has been changed is assumed to be the sheet feeding cassette 2 (103), an image portion corresponding to the sheet feeding cassette 2 (103) is highlighted in a dark color.

A button 2804 is a reservation cancellation confirmation button, and is a button for receiving a reservation cancellation confirmation made by the user. A button 2805 is a reservation cancellation cancellation button, and is a button for receiving cancellation of a reservation cancellation made by the user. In step S2704, the CPU 202 determines whether the button 2804 has been pressed. In a case where the button 2804 has been pressed (YES in step S2704), the processing proceeds to step S2705. In step S2705, the CPU 202 cancels the reservation. The reservation cancel processing is similar to that illustrated in the flowchart in FIG. 22. In a case where the button 2805 has been pressed (NO in step S2704), the processing is ended.

By performing the reservation cancel processing in the flowchart illustrated in FIG. 27, it is possible to prevent the user from changing a sheet setting with being unaware of a reserved state of a sheet feeding deck.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-154907, filed Sep. 28, 2022, which is hereby incorporated by reference herein in its entirety.

What is claimed is:

1. An image forming apparatus comprising:
   a plurality of sheet feeding units;
   one or more processors; and
   one or more memories storing instructions that, when executed, cause the one or more processors to function as:
   a reservation unit including an instruction reception unit configured to receive a reservation instruction for reserving a sheet feeding unit of the plurality of sheet feeding units, wherein the reservation instruction is not related to a specific print job but rather relates to imposing a usage restriction on a respective sheet feeding unit;
   a job reception unit configured to receive a print job;
      an identification unit configured to identify a sheet feeding unit from among the plurality of sheet feeding units for use in printing the received print job based on a setting of the received print job; and
   a notification unit configured to, in response to an execution instruction of the received print job, where the sheet feeding unit that is identified by the identification unit for use in printing the received print job is a sheet feeding unit for which the instruction reception unit has received a reservation instruction, notify a user of information indicating that the sheet feeding unit is reserved, unless the print job is a print job in which a specific setting is made.

2. The image forming apparatus according to claim 1, wherein the identification unit identifies the sheet feeding unit from among the plurality of sheet feeding units based on a setting of a sheet size of the received print job.

3. The image forming apparatus according to claim 2, wherein the sheet feeding unit identified by the identification unit is a sheet feeding unit for which a same sheet size as the setting of the sheet size of the print job is set.

4. The image forming apparatus according to claim 1, further comprising a cancelling unit configured to cancel, in a case where a sheet feeding unit for which the instruction reception unit has received the reservation instruction is opened, reservation of the sheet feeding unit.

5. The image forming apparatus according to claim 1, wherein, in a print job in which the specific setting is made, a sheet feeding unit for which the instruction reception unit has received the reservation instruction is preferentially used.

6. The image forming apparatus according to claim 1, further comprising a confirmation unit configured to confirm, in a case where the instruction reception unit receives the reservation instruction for reserving the sheet feeding unit, whether a sheet of the sheet feeding unit has been replaced.

7. The image forming apparatus according to claim 6, further comprising a display unit,
   wherein the confirmation unit displays, on the display unit, a screen for confirming whether the sheet of the sheet feeding unit has been replaced.

8. A control method of an image forming apparatus including a plurality of sheet feeding units, the control method comprising:
   receiving a reservation instruction for reserving a sheet feeding unit of the plurality of sheet feeding units, wherein the reservation instruction is not related to a specific print job but rather relates to imposing a usage restriction on a respective sheet feeding unit;
   receiving a print job;
   identifying a sheet feeding unit from among the plurality of sheet feeding units for use in printing the received print job based on a setting of the received print job; and
   in response to an execution instruction of the received print job, where the sheet feeding unit that is identified by the identifying for use in printing the received print job is a sheet feeding unit for which a reservation instruction has been received, notifying a user of information indicating that the sheet feeding unit is reserved, unless the print job is a print job in which a specific setting is made.

* * * * *